(12) United States Patent
Houston et al.

(10) Patent No.: US 7,091,446 B2
(45) Date of Patent: Aug. 15, 2006

(54) ELECTRIC ARC WELDING SYSTEM

(75) Inventors: William S. Houston, Avon, OH (US);
Russell K. Myers, Hudson, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 270 days.

(21) Appl. No.: 10/735,103

(22) Filed: Dec. 15, 2003

(65) Prior Publication Data

US 2005/0127054 A1 Jun. 16, 2005

(51) Int. Cl.
*B23K 9/09* (2006.01)

(52) U.S. Cl. .................................. 219/130.51

(58) Field of Classification Search ............. 219/130.1, 219/130.51, 137 PS
See application file for complete search history.

(56) References Cited

U.S. PATENT DOCUMENTS

| | | | |
|---|---|---|---|
| 4,806,735 A | 2/1989 | Ditschun et al. | |
| 5,140,140 A | 8/1992 | Pollack | |
| 5,214,265 A | 5/1993 | Pollack | |
| 5,278,390 A | 1/1994 | Blankenship | |
| 6,111,216 A | 8/2000 | Stava | |
| 6,177,651 B1 * | 1/2001 | Reynolds et al. | 219/137 PS |
| 6,207,929 B1 | 3/2001 | Stava | |
| 6,291,798 B1 | 9/2001 | Stava | |

| | | |
|---|---|---|
| 6,472,634 B1 | 10/2002 | Houston |

FOREIGN PATENT DOCUMENTS

| | | |
|---|---|---|
| DE | 37 35 834 C1 | 4/1989 |
| EP | 1 439 021 A | 7/2004 |

OTHER PUBLICATIONS

European Search Report, Application No. EP 04 02 4450, Mar. 14, 2005, Examiner T. Jeggy.

* cited by examiner

*Primary Examiner*—Clifford C. Shaw
(74) *Attorney, Agent, or Firm*—Fay, Sharpe, Fagan, Minnich & McKee, LLP

(57) ABSTRACT

An electric arc welding system and method for creating a first AC welding arc with a first current waveform between a first electrode and a workpiece by a first power supply and a second AC welding arc with a second current waveform between a second electrode and a workpiece by a second power supply as the first and second electrodes are moved in unison along a welding path where the first and second power supply each comprising an high speed switching inverter creating its waveform by a number of current pulses occurring at a frequency of at least 18 kHz with the magnitude of each current pulse controlled by a wave shaper and the polarity of the waveforms controlled by a signal. The first and second AC waveforms each have a positive portion and a negative portion and a cycle period of about 10–20 ms and timing circuits for determining the push and pull times between the arcs and a waveform adjusting circuit to limit the push and pull times to less than about 5.0 ms.

39 Claims, 14 Drawing Sheets

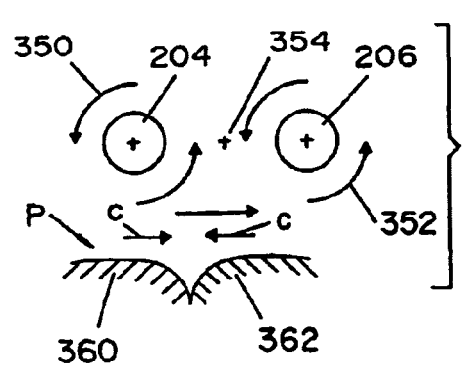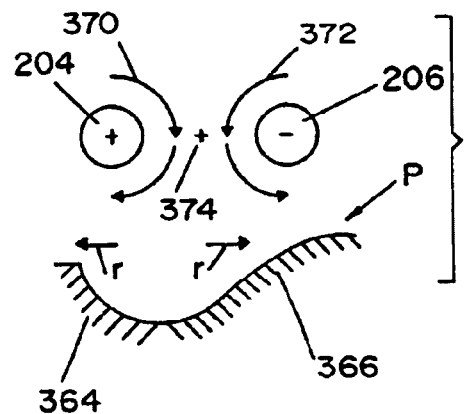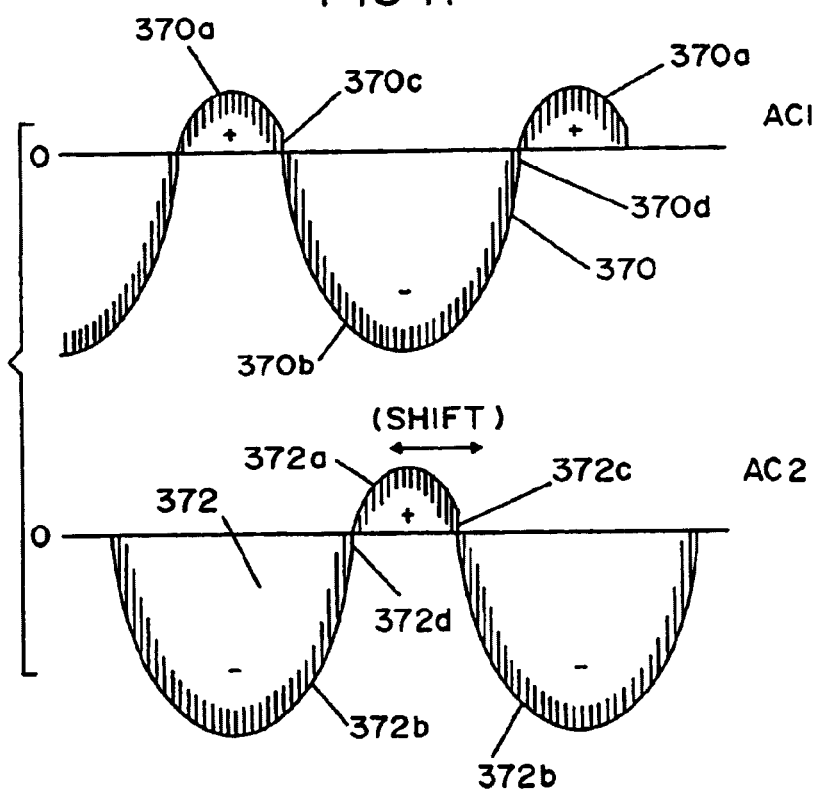

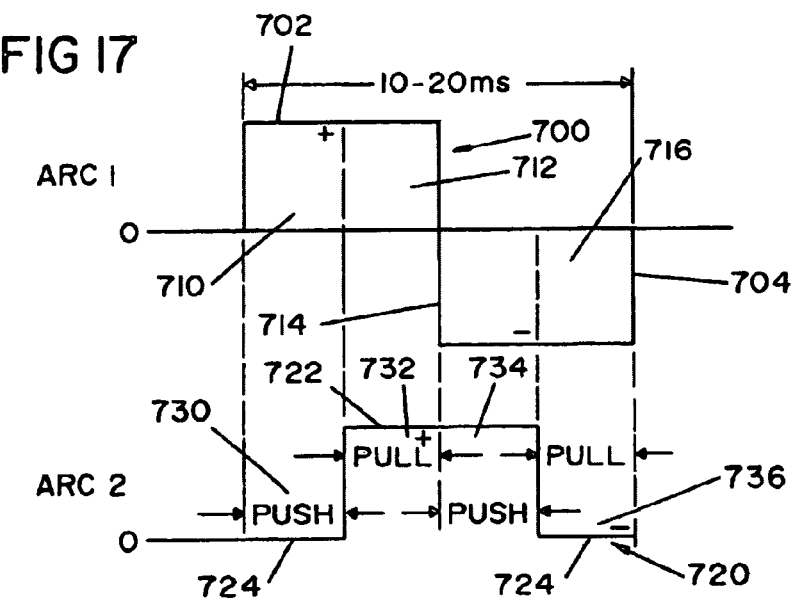
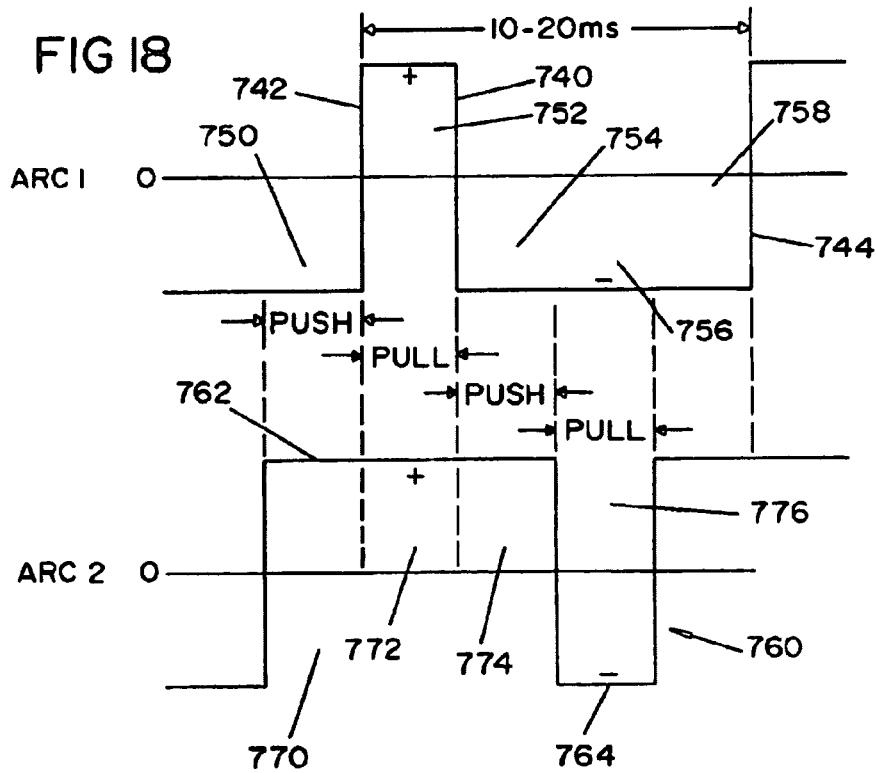

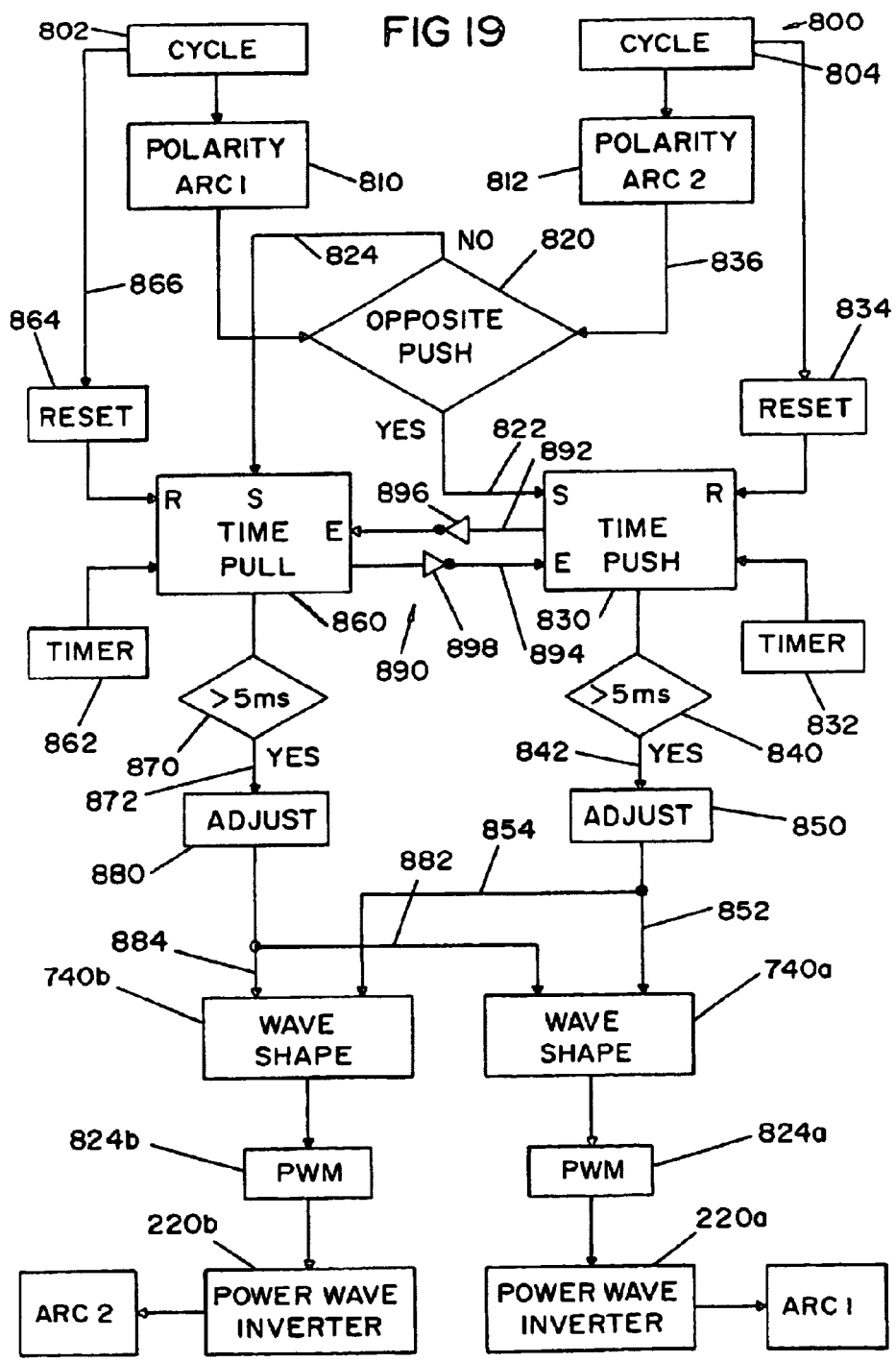

ELECTRIC ARC WELDING SYSTEM

The present invention relates to the art of electric arc welding and more particularly to an electric arc welding system to operate tandem electrodes.

INCORPORATION BY REFERENCE

The present invention is directed to an electric arc welding system utilizing high capacity alternating circuit power supplies for driving two or more tandem electrodes of the type used in seam welding of large metal blanks. Although the invention can be used with any standard AC power supply with switches for changing the output polarity, it is preferred that the power supplies use the switching concept disclosed in Stava U.S. Pat. No. 6,111,216 wherein the power supply is an inverter having two large output polarity switches with the arc current being reduced before the switches reverse the polarity. Consequently, the term "switching point" is a complex procedure whereby the power supply is first turned off awaiting a current less than a preselected value, such as 100 amperes. Upon reaching the 100 ampere threshold, the output switches of the power supply are reversed to reverse the polarity from the D.C. output link of the inverter. Thus, the "switching point" is an off output command, known as a "kill" command, to the power supply inverter followed by a switching command to reverse the output polarity. The kill output can be a drop to a decreased current level. This procedure is duplicated at each successive polarity reversal so the AC power supply reverses polarity only at a low current. In this manner, snubbing circuits for the output polarity controlling switches are reduced in size or eliminated. Since this switching concept is preferred to define the switching points as used in the present invention, Stava U.S. Pat. No. 6,111,216 is incorporated by reference. The concept of an AC current for tandem electrodes is well known in the art. U.S. Pat. No. 6,207,929 discloses a system whereby tandem electrodes are each powered by a separate inverter type power supply. The frequency is varied to reduce the interference between alternating current in the adjacent tandem electrodes. Indeed, this prior patent of assignee relates to single power sources for driving either a DC powered electrode followed by an AC electrode or two or more AC driven electrodes. In each instance, a separate inverter type power supply is used for each electrode and, in the alternating current high capacity power supplies, the switching point concept of Stava U.S. Pat. No. 6,111,216 is employed. This system for separately driving each of the tandem electrodes by a separate high capacity power supply is background information to the present invention and is incorporated herein as such background. In a like manner, U.S. Pat. No. 6,291,798 discloses a further arc welding system wherein each electrode in a tandem welding operation is driven by two or more independent power supplies connected in parallel with a single electrode arc. The system involves a single set of switches having two or more accurately balanced power supplies forming the input to the polarity reversing switch network operated in accordance with Stava U.S. Pat. No. 6,111,216. Each of the power supplies is driven by a single command signal and, therefore, shares the identical current value combined and directed through the polarity reversing switches. This type system requires large polarity reversing switches since all of the current to the electrode is passed through a single set of switches. U.S. Pat. No. 6,291,798 does show a master and slave combination of power supplies for a single electrode and discloses general background information to which the invention is directed. For that reason, this patent is also incorporated by reference. An improvement for operating tandem electrodes with controlled switching points is disclosed in Houston U.S. Pat. No. 6,472,634. This patent is incorporated by reference.

BACKGROUND OF INVENTION

Welding applications, such as pipe welding, often require high currents and use several arcs created by tandem electrodes. Such welding systems are quite prone to certain inconsistencies caused by arc disturbances due to magnetic interaction between two adjacent tandem electrodes. A system for correcting the disadvantages caused by adjacent AC driven tandem electrodes is disclosed in Stava U.S. Pat. No. 6,207,929. In that prior patent, each of the AC driven electrodes has its own inverter based power supply. The output frequency of each power supply is varied so as to prevent interference between adjacent electrodes. This system requires a separate power supply for each electrode. As the current demand for a given electrode exceeds the current rating of the inverter based power supply, a new power supply must be designed, engineered and manufactured. Thus, such system for operating tandem welding electrodes require high capacity or high rated power supplies to obtain high current as required for pipe welding. To decrease the need for special high current rated power supplies for tandem operated electrodes, assignee developed the system disclosed in Stava U.S. Pat. No. 6,291,798 wherein each AC electrode is driven by two or more inverter power supplies connected in parallel. These parallel power supplies have their output current combined at the input side of a polarity switching network. Thus, as higher currents are required for a given electrode, two or more parallel power supplies are used. In this system, each of the power supplies are operated in unison and share equally the output current. Thus, the current required by changes in the welding conditions can be provided only by the over current rating of a single unit. A current balanced system did allow for the combination of several smaller power supplies; however, the power supplies had to be connected in parallel on the input side of the polarity reversing switching network. As such, large switches were required for each electrode. Consequently, such system overcame the disadvantage of requiring special power supplies for each electrode in a tandem welding operation of the type used in pipe welding; but, there is still the disadvantage that the switches must be quite large and the input, paralleled power supplies must be accurately matched by being driven from a single current command signal. Stava U.S. Pat. No. 6,291,798 does utilize the concept of a synchronizing signal for each welding cell directing current to each tandem electrode. However, the system still required large switches. This type of system was available for operation in an ethernet network interconnecting the welding cells. In ethernet interconnections, the timing cannot be accurately controlled. In the system described, the switch timing for a given electrode need only be shifted on a time basis, but need not be accurately identified for a specific time. Thus, the described system requiring balancing the current and a single switch network has been the manner of obtaining high capacity current for use in tandem arc welding operations when using an ethernet network or an internet and ethernet control system. There is a desire to control welders by an ethernet network, with or without an internet link. Due to timing limitation, these networks dictated use of tandem electrode systems of the type using only general synchronizing techniques.

Such systems could be controlled by a network; however, the parameter to each paralleled power supply could not be varied. Each of the cells could only be offset from each other by a synchronizing signal. Such systems were not suitable for central control by the internet and/or local area network control because an elaborate network to merely provide offset between cells was not advantageous. Houston U.S. Pat. No. 6,472,634 discloses the concept of a single AC arc welding cell for each electrode wherein the cell itself includes one or more paralleled power supplies each of which has its own switching network. The output of the switching network is then combined to drive the electrode. This allows the use of relatively small switches for polarity reversing of the individual power supplies paralleled in the system. In addition, relatively small power supplies can be paralleled to build a high current input to each of several electrodes used in a tandem welding operation. The use of several independently controlled power supplies paralleled after the polarity switch network for driving a single electrode allows advantageous use of a network, such as the internet or ethernet.

In Houston U.S. Pat. No. 6,472,634, smaller power supplies in each system are connected in parallel to power a single electrode. By coordinating switching points of each paralleled power supply with a high accuracy interface, the AC output current is the sum of currents from the paralleled power supplies without combination before the polarity switches. By using this concept, the ethernet network, with or without an internet link, can control the weld parameters of each paralleled power supply of the welding system. The timing of the switch points is accurately controlled by the novel interface, whereas the weld parameters directed to the controller for each power supply can be provided by an ethernet network which has no accurate time basis. Thus, an internet link can be used to direct parameters to the individual power supply controllers of the welding system for driving a single electrode. There is no need for a time based accuracy of these weld parameters coded for each power supply. In the preferred implementation, the switch point is a "kill" command awaiting detection of a current drop below a minimum threshold, such as 100 amperes. When each power supply has a switch command, then they switch. The switch points between parallel power supplies, whether instantaneous or a sequence involving a "kill" command with a wait delay, are coordinated accurately by an interface card having an accuracy of less than 10 μs and preferably in the range of 1–5 μs. This timing accuracy coordinates and matches the switching operation in the paralleled power supplies to coordinate the AC output current.

By using the internet or ethernet local area network, the set of weld parameters for each power supply is available on a less accurate information network, to which the controllers for the paralleled power supplies are interconnected with a high accuracy digital interface card. Thus, the switching of the individual, paralleled power supplies of the system is coordinated. This is an advantage allowing use of the internet and local area network control of a welding system. The information network includes synchronizing signals for initiating several arc welding systems connected to several electrodes in a tandem welding operation in a selected phase relationship. Each of the welding systems of an electrode has individual switch points accurately controlled while the systems are shifted or delayed to prevent magnetic interference between different electrodes. This allows driving of several AC electrodes using a common information network. The Houston U.S. Pat. No. 6,472,634 system is especially useful for paralleled power supplies to power a given electrode with AC current. The switch points are coordinated by an accurate interface and the weld parameter for each paralleled power supply is provided by the general information network. This background is technology developed and patented by assignee and does not necessarily constitute prior art just because it is herein used as "background."

As a feature of the system in Stava U.S. Pat. No. 6,207,929, two or more power supplies can drive a single electrode. Thus, the system comprises a first controller for a first power supply to cause the first power supply to create an AC current between the electrode and workpiece by generating a switch signal with polarity reversing switching points in general timed relationship with respect to a given system synchronizing signal received by the first controller. This first controller is operated at first welding parameters in response to a set of first power supply specific parameter signals directed to the first controller. There is provided at least one slave controller for operating the slave power supply to create an AC current between the same electrode and workpiece by reversing polarity of the AC current at switching points. The slave controller operates at second weld parameters in response to the second set of power supply specific parameter signals to the slave controller. An information network connected to the first controller and the second or slave controller contains digital first and second power supply specific parameter signals for the two controllers and the system specific synchronizing signal. Thus, the controllers receive the parameter signals and the synchronizing signal from the information network, which may be an ethernet network with or without an internet link, or merely a local area network. The invention involves a digital interface connecting the first controller and the slave controller to control the switching points of the second or slave power supply by the switch signal from the first or master controller. In practice, the first controller starts a current reversal at a switch point. This event is transmitted at high accuracy to the slave controller to start its current reversal process. When each controller senses an arc current less than a given number, a "ready signal" is created. After a "ready" signal from all paralleled power supplies, all power supplies reverse polarity. This occurs upon receipt of a strobe or look command each 25 μs. Thus, the switching is in unison and has a delay of less than 25 μs. Consequently, both of the controllers have interconnected data controlling the switching points of the AC current to the single electrode. The same controllers receive parameter information and a synchronizing signal from an information network which in practice comprises a combination of internet and ethernet or a local area ethernet network. The timing accuracy of the digital interface is less than about 10 μs and, preferably, in the general range of 1–5 μs. Thus, the switching points for the two controllers driving a single electrode are commanded within less than 5 μs. Then, switching actually occurs within 25 μs. At the same time, relatively less time sensitive information is received from the information network also connected to the two controllers driving the AC current to a single electrode in a tandem welding operation. The 25 μs maximum delay can be changed, but is less than the switch command accuracy.

The unique control system disclosed in Houston U.S. Pat. No. 6,472,634 is used to control the power supply for tandem electrodes used primarily in pipe seam welding and disclosed in Stava U.S. Pat. No. 6,291,798. This Stava patent relates to a series of tandem electrodes movable along a welding path to lay successive welding beads in the space between the edges of a rolled pipe or the ends of two adjacent pipe sections. The individual AC waveforms used in this unique technology are created by a number of current pulses occurring at a frequency of at least 18 kHz with a magnitude of each current pulse controlled by a wave shaper. This technology dates back to Blankenship U.S. Pat. No. 5,278,390. Shaping of the waveforms in the AC currents of two adjacent tandem electrodes is known and is shown in not only the patents mentioned above, but in Stava U.S. Pat. No. 6,207,929. In this latter Stava patent, the frequency of the AC current at adjacent tandem electrodes is adjusted to prevent magnetic interference. All of these patented technologies by The Lincoln Electric Company of Cleveland, Ohio have been advances in the operation of tandem electrodes each of which is operated by a separate AC waveform created by the waveform technology set forth in these patents. These patents are incorporated by reference herein. However, these patents do not disclose the present invention which is directed to the use of such waveform technology for use in tandem welding by adjacent electrodes each using an AC current. This technology, as the normal transformer technology, has experienced difficulty in controlling the dynamics of the weld puddle. Thus, there is a need for an electric arc welding system for adjacent tandem electrodes which is specifically designed to control the dynamics and physics of the molten weld puddle during the welding operation. These advantages can not be obtained by merely changing the frequency to reduce the magnetic interference.

THE INVENTION

The present invention relates to an improvement in the waveform technology disclosed in Blankenship U.S. Pat. No. 5,278,390 and used for tandem electrode welding systems by several patents, including Stava U.S. Pat. No. 6,207,929; Stava U.S. Pat. No. 6,291,798; and, Houston U.S. Pat. No. 6,472,634. The improvement over this well developed technology is the control of the AC waveforms generated by adjacent tandem electrodes in a manner where the weld puddle is quiescent during the welding operation. This objective is accomplished by using a system that controls the relationship between the AC current of adjacent tandem electrodes to limit the time of concurrent polarity relationships, such as like polarity and opposite polarity, while obtaining a difference in penetration and deposition. It has been found that due to arc force on the weld pool during the times of like polarity in the waveforms of two adjacent tandem electrodes the molten metal weld pool physically collapses whereas during opposite polarity of the waveforms for adjacent tandem electrodes the weld pool is repelled. If the adjacent AC pulses have a long time, exceeding 20 ms, with a concurrent polarity relationship, the collapsing or repelling action of the molten metal in the weld pool is disruptive to the welding process. The resulting weld bead that subsequently solidifies is not uniform. In using an AC current for adjacent electrodes, the invention assures that there is no long term concurrence of any one specific polarity relationship.

The present invention preferably employs the AC/DC Power Wave welder manufactured and distributed by The Lincoln Electric Company of Cleveland, Ohio. This equipment overcomes the need to trade-off between penetration and deposition in a multi-electrode welding operation. To accomplish this objective, the Power Wave power source uses a combination of amplitude and duration together to allow high penetration and high deposition without increasing average current, which would increase heat input, lower weld metal toughness and increase the electromagnetic field leading to arc blow and weld puddle instability. The standard practice to increase production rate in submerged arc welding is to increase the current to a level just below a threshold in which the arc becomes unstable. Beyond current increases, further gains in productivity are made by increasing the number of electrodes, to as many as six separate electrodes. To achieve the required penetration without excessive reinforcement, a single DC arc is employed as the lead electrode. Due to the magnetic interaction, only one DC arc can be employed. This limits the penetration for a given reinforcement level. With the novel technology of the present invention, a DC electrode is no longer required to achieve the required penetration. For example, the first and second arcs are AC waveforms that are shifted to achieve high penetration with low deposition and the electromagnetic interaction is controlled by the phase relationship of the waveforms used in the two tandem electrodes. This arrangement simplifies the customer installation by reducing the number of different types of power sources that are required for a given welding operation. Thus, there is a reduction in the maintenance complexities at the work site.

The invention is directed to a welding system and method wherein several electrodes are used in a single weld puddle and controlled in a manner to minimize the electromagnetic interaction to achieve stability of the weld puddle. The invention utilizes a high speed switching inverter, such as a Power Wave sold by The Lincoln Electric Company that can be adjusted with infinite resolution with waveforms that are adjusted in one degree increments. The adjustment to the waveforms and phase relationship are accomplished by calculating the time the two adjacent arcs are at the same and opposite polarities. The high speed inverter type waveform controlled power source changes the relationship in accordance with the invention to achieve balance between the time of same polarity and the time of opposite polarity of adjacent AC powered electrodes. The balanced time is such that the adjacent electrodes are not at the same or opposite polarity for a sustained time greater than about 5.0 ms. This advantage is achieved by determining the time adjacent AC waveforms are at the same polarity or at different polarities. Then the waveforms are adjusted to minimize the sustained maintained time during the welding cycle when the adjacent waveforms are at opposite polarity to "push" the arcs directed toward the weld puddle or like polarities to "pull" the arcs directed toward the weld puddle. This minimizing of the push and pull of the arcs is accomplished during the welding process by the use of waveform technology. The waveforms are adjusted to assure that a push or pull condition does not last for more than about 5.0 ms. To accomplish the invention, a novel system and method have been developed.

In accordance with the invention, an electric arc welding system is provided for creating a first AC welding arc with a first current waveform between a first electrode and a workpiece by a first power supply and a second AC welding arc with a second current waveform between a second electrode and a workpiece by a second power supply as said first and second electrodes are moved in unison along a welding path. The first and second electrodes may be any of adjacent AC driven electrodes in a group of electrodes used for a single welding operation. Primarily, this invention relates to submerged arc welding used in pipe welding. In accordance with the invention, the first and second power supplies each comprise a high speed switching inverter creating its waveform by a number of current pulses at a frequency of at least 18 kHz with the magnitude of each current pulse controlled by a wave shaper or wave generator and a plurality of the waveforms controlled by a signal as disclosed in Houston U.S. Pat. No. 6,472,634. In accordance with the invention, the first and second AC waveforms each have a positive portion and a negative portion and a cycle period of about 10–20 ms. A first timing circuit is used for determining the arc push time of a sustained maintenance of opposite polarities between the waveforms and a waveform adjusting circuit to limit the arc push time to less than about 5.0 ms. In this manner, the push time for the arc is less than about 5.0 ms. In accordance with another aspect of the invention, there is provided a second timing circuit for determining the arc pull time of a sustained maintenance of same polarity between the waveforms and a waveform adjusting circuit to limit the pull time of the arc to less than about 5.0 ms. The preferred embodiment of the invention involves a system that limits both the push and pull time for the arcs extending toward the weld puddle, so the electric arcs extend vertically downwardly from adjacent electrodes and do not push away from or pull toward each other.

In accordance with another aspect of the present invention there is provided an electric arc welding method for creating a first AC welding arc with a first current waveform between a first electrode and workpiece by a first power supply and a second AC welding arc with a second current waveform between a second electrode and a workpiece by a second power supply as the first and second electrodes are moved in unison along a welding path. This method employs the system defined above wherein the push time and/or pull time of the arcs between adjacent electrodes are limited to less than about 5.0 ms by adjusting the shape of waveforms used in the power supplies.

By using the present invention, a weld puddle is controlled so that the arc current of adjacent AC electrodes is substantially vertical toward the puddle and the puddle remains quiescent. This is the primary object of the present invention.

Another object of the present invention is the provision of an electric arc welding system for creating two AC welding arcs at adjacent tandem electrodes which welding system limits the time when there is a concurrence of a specific polarity relationship.

Still a further object of the present invention is the provision of an electric arc welding system, as defined above, which welding system is used to perform a method wherein the electromagnetic push and/or the electromagnetic pull of the arcs for adjacent electrodes are both limited to less than about 5.0 ms. By using this method, penetration and deposition can be optimized without agitating the molten metal in the weld puddle traversed by adjacent AC driven electrodes.

Yet another object of the present invention is the provision of an electric arc method and/or system, as defined above, which method and system controls the dynamics of the weld puddle to prevent puddle agitation and obtain a uniform weld bead.

Still a further object of the present invention is the provision of an electric arc welding system and method, as defined above, which system and method utilizes waveform technology to obtain the advantages of a weld puddle control that maintains vertical arcs from adjacent electrodes driven by AC current from an inverter high speed switching type power supply.

These and other objects and advantages will become apparent from the following description taken together with the accompanying drawings.

BRIEF DESCRIPTION OF DRAWINGS

FIGS. 9 and 10 are schematic drawings illustrating the dynamics of the weld puddle during concurrent polarity relationships of tandem electrodes to explain the advantage of the present invention;

FIG. 11 is a pair of current graphs showing the waveforms on two adjacent tandem electrodes employing the present invention;

FIG. 17 is a current graph showing the AC current of adjacent electrodes used in tandem welding and employing the present invention;

FIG. 18 is a current graph, similar to the graph in FIG. 17, showing a different relationship of the AC current waveforms used at adjacent tandem electrodes and employing the present invention; and, FIG. 19 is a block diagram illustrating the preferred program, system or method of the present invention.

PREFERRED EMBODIMENT

Figure 1:
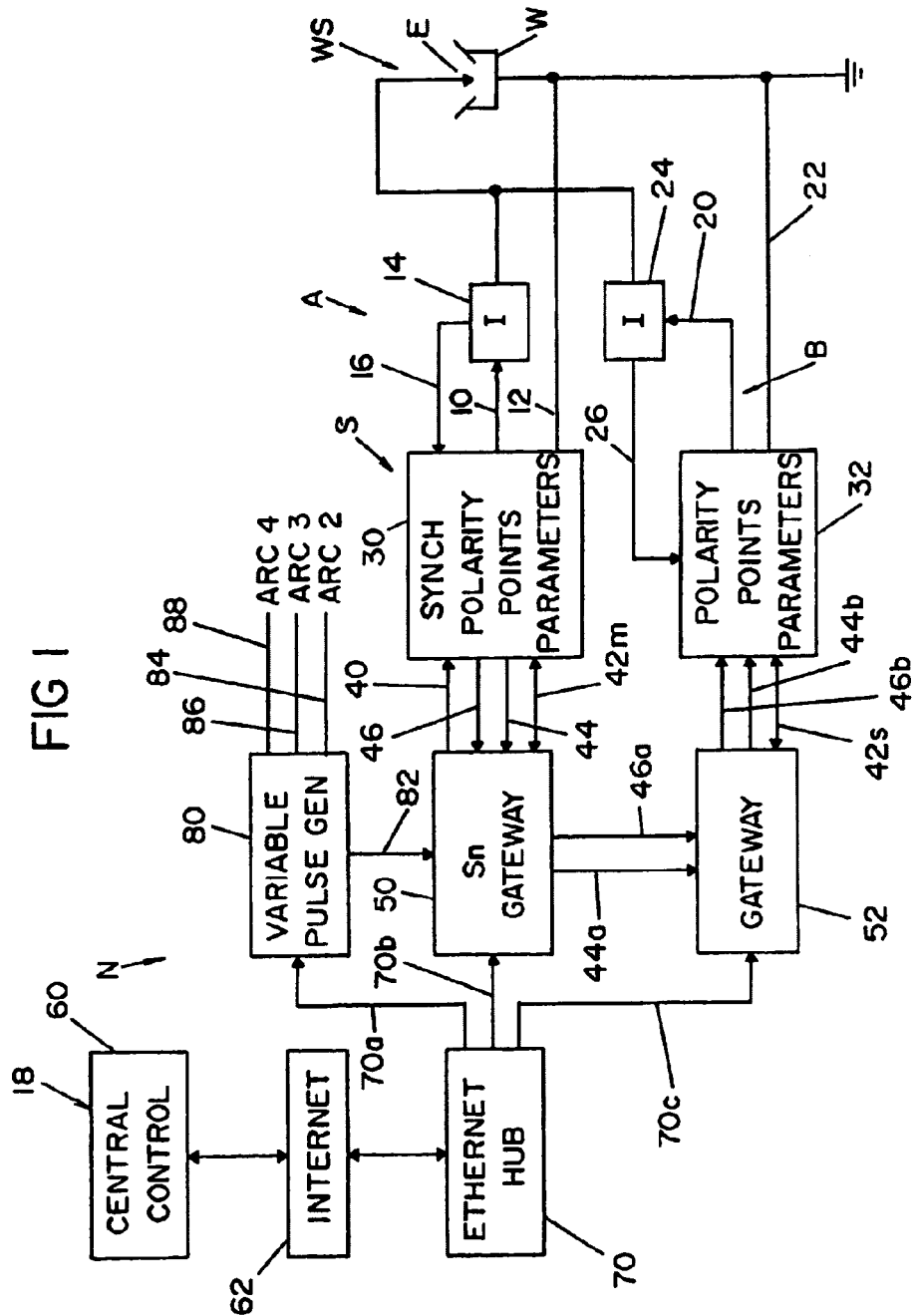
FIG. 1 is a block diagram of the preferred embodiment of the present invention.

Referring now to the drawings wherein the showings are for the purpose of illustrating background technology in FIGS. 1–16 and the preferred embodiment of the invention in FIGS. 17–19. This is not for the purpose of limiting the invention. The preferred system for implementing the invention is shown in detail in FIGS. 1, 2 AND 16. In FIG. 1 there is a single electric arc welding system S in the form of a single cell to create an alternating current as an arc at weld station WS. This system or cell includes a first master welder A with output leads 10, 12 in series with electrode E and workpiece W in the form of a pipe seam joint or other welding operation. Hall effect current transducer 14 provides a voltage in line 16 proportional to the current of welder A. Less time critical data, such as welding parameters, are generated at a remote central control 18. In a like manner, a slave following welder B includes leads 20, 22 connected in parallel with leads 10, 12 to direct an additional AC current to the weld station WS. Hall effect current transducer 24 creates a voltage in line 26 representing current levels in welder B during the welding operation. Even though a single slave or follower welder B is shown, any number of additional welders can be connected in parallel with master welder A to produce an alternating current across electrode E and workpiece W. The AC current is combined at the weld station instead of prior to a polarity switching network. Each welder includes a controller and inverter based power supply illustrated as a combined master controller and power supply 30 and a slave controller and power supply 32. Controllers 30, 32 receive parameter data and synchronization data from a relatively low level logic network. The parameter information or data is power supply specific whereby each of the power supplies is provided with the desired parameters such as current, voltage and/or wire feed speed. A low level digital network can provide the parameter information; however, the AC current for polarity reversal occurs at the same time. The "same" time indicates a time difference of less than 10 μs and preferably in the general range of 1–5 μs. To accomplish precise coordination of the AC output from power supply 30 and power supply 32, the switching points and polarity information can not be provided from a general logic network wherein the timing is less precise. The individual AC power supplies are coordinated by high speed, highly accurate DC logic interface referred to as "gateways." As shown in FIG. 1, power supplies 30, 32 are provided with the necessary operating parameters indicated by the bi-directional leads 42m, 42s, respectively. This non-time sensitive information is provided by a digital network shown in FIG. 1. Master power supply 30 receives a synchronizing signal as indicated by unidirectional line 40 to time the controllers operation of its AC output current. The polarity of the AC current for power supply 30 is outputted as indicated by line 46. The actual switching command for the AC current of master power supply 30 is outputted on line 44. The switch command tells power supply S, in the form of an inverter, to "kill," which is a drastic reduction of current. In an alternative, this is actually a switch signal to reverse polarity. The "switching points" or command on line 44 preferably is a "kill" and current reversal commands utilizing the "switching points" as set forth in Stava U.S. Pat. No. 6,111,216. Thus, timed switching points or commands are outputted from power supply 30 by line 44. These switching points or commands may involve a power supply "kill" followed by a switch ready signal at a low current or merely a current reversal point. The switch "ready" is used when the "kill" concept is implemented because neither inverters are to actually reverse until they are below the set current. This is described in FIG. 16. The polarity of the switches of controller 30 controls the logic on line 46. Slave power supply 32 receives the switching point or command logic on line 44b and the polarity logic on line 46b. These two logic signals are interconnected between the master power supply and the slave power supply through the highly accurate logic interface shown as gateway 50, the transmitting gateway, and gateway 52, the receiving gateway. These gateways are network interface cards for each of the power supplies so that the logic on lines 44b, 46b are timed closely to the logic on lines 44, 46, respectively. In practice, network interface cards or gateways 50, 52 control this logic to within 10 μs and preferably within 1–5 μs. A low accuracy network controls the individual power supplies for data from central control 18 through lines 42m, 42s, illustrated as provided by the gateways or interface cards. These lines contain data from remote areas (such as central control 18) which are not time sensitive and do not use the accuracy characteristics of the gateways. The highly accurate data for timing the switch reversal uses interconnecting logic signals through network interface cards 50, 52. The system in FIG. 1 is a single cell for a single AC arc; however, the invention is directed to tandem electrodes wherein two or more AC arcs are created to fill the large gap found in pipe welding. Thus, the master power supply 30 for the first electrode receives a synchronization signal which determines the timing or phase operation of the system S for a first electrode, i.e. ARC 1. System S is used with other identical systems to generate ARCs 2, 3, and 4 timed by synchronizing outputs 84, 86 and 88. This concept is schematically illustrated in FIG. 5. The synchronizing or phase setting signals 82–88 are shown in FIG. 1 with only one of the tandem electrodes. An information network N comprising a central control computer and/or web server 60 provides digital information or data relating to specific power supplies in several systems or cells controlling different electrodes in a tandem operation. Internet information 62 is directed to a local area network in the form of an ethernet network 70 having local interconnecting lines 70a, 70b, 70c. Similar interconnecting lines are directed to each power supply used in the four cells creating ARCs 1, 2, 3 and 4 of a tandem welding operation. The description of system or cell S applies to each of the arcs at the other electrodes. If AC current is employed, a master power supply is used. In some instances, merely a master power supply is used with a cell specific synchronizing signal. If higher currents are required, the systems or cells include a master and slave power supply combination as described with respect to system S of FIG. 1. In some instances, a DC arc is used with two or more AC arcs synchronized by generator 80. Often the DC arc is the leading electrode in a tandem electrode welding operation, followed by two or more synchronized AC arcs. A DC power supply need not be synchronized, nor is there a need for accurate interconnection of the polarity logic and switching points or commands. Some DC powered electrodes may be switched between positive and negative, but not at the frequency of an AC driven electrode. Irrespective of the make-up of the arcs, ethernet or local area network 70 includes the parameter information identified in a coded fashion designated for specific power supplies of the various systems used in the tandem welding operation. This network also employs synchronizing signals for the several cells or systems whereby the systems can be offset in a time relationship. These synchronizing signals are decoded and received by a master power supply as indicated by line 40 in FIG. 1. In this manner, the AC arcs are offset on a time basis. These synchronizing signals are not required to be as accurate as the switching points through network interface cards or gateways 50, 52. Synchronizing signals on the data network are received by a network interface in the form of a variable pulse generator 80. The generator creates offset synchronizing signals in lines 84, 86 and 88. These synchronizing signals dictate the phase of the individual alternating current cells for separate electrodes in the tandem operation. Synchronizing signals can be generated by interface 80 or actually received by the generator through the network 70. In practice, network 70 merely activates generator 80 to create the delay pattern for the many synchronizing signals. Also, generator 80 can vary the frequency of the individual cells by frequency of the synchronizing pulses if that feature is desired in the tandem welding operation.

Figure 2:
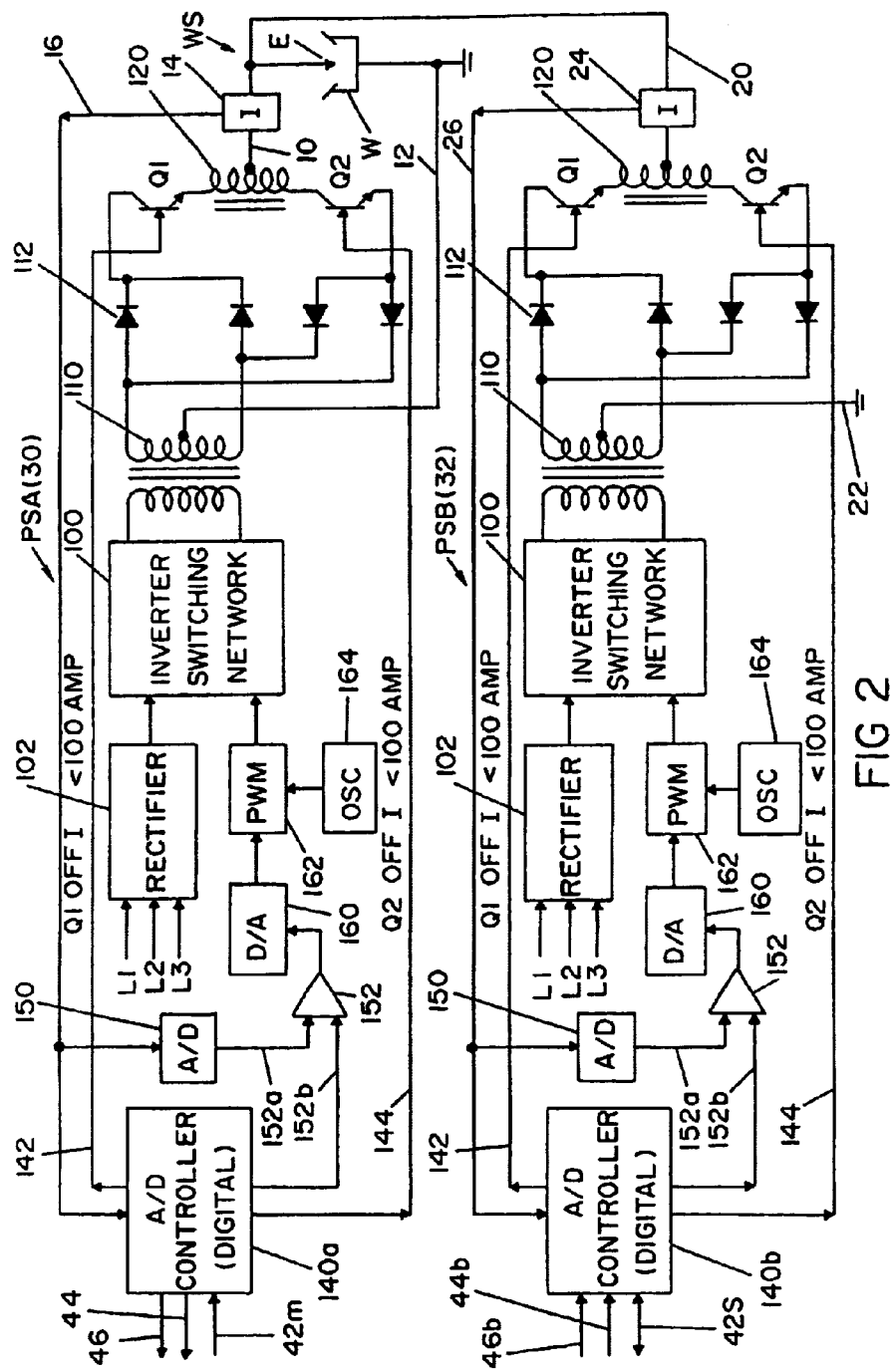
FIG. 2 is a wiring diagram of two paralleled power supplies, each of which include a switching output which power supplies are used in practicing the invention.

A variety of controllers and power supplies could be used for practicing the system as described in FIG. 1; however, preferred implementation of the system is set forth in FIG. 2 wherein power supply PSA is combined with controller and power supply 30 and power supply PSB is combined with controller and power supply 32. These two units are essentially the same in structure and are labeled with the same numbers when appropriate. Description of power supply PSA applies equally to power supply PSB. Inverter 100 has an input rectifier 102 for receiving three phase line current L1, L2, and L3. Output transformer 110 is connected through an output rectifier 112 to tapped inductor 120 for driving opposite polarity switches Q1, Q2. Controller 140a of power supply PSA and controller 140b of PSB are essentially the same, except controller 140a outputs timing information to controller 140b. Switching points or lines 142, 144 control the conductive condition of polarity switches Q1, Q2 for reversing polarity at the time indicated by the logic on lines 142, 144, as explained in more detail in Stava U.S. Pat. No. 6,111,216 incorporated by reference herein. The control is digital with a logic processor; thus, A/D converter 150 converts the current information on feedback line 16 or line 26 to controlling digital values for the level of output from error amplifier 152 which is illustrated as an analog error amplifier. In practice, this is a digital system and there is no further analog signal in the control architecture. As illustrated, however, amplifier has a first input 152a from converter 150 and a second input 152b from controller 140a or 140b. The current command signal on line 152b includes the wave shape or waveform required for the AC current across the arc at weld station WS. This is standard practice as taught by several patents of Lincoln Electric, such as Blankenship U.S. Pat. No. 5,278,390, incorporated by reference. See also Stava U.S. Pat. No. 6,207,929, incorporated by reference. The output from amplifier 152 is converted to an analog voltage signal by converter 160 to drive pulse width modulator 162 at a frequency controlled by oscillator 164, which is a timer program in the processor software. The shape of the waveform at the arcs is the voltage or digital number at lines 152b. The frequency of oscillator 164 is greater than 18 kHz. The total architecture of this system is digitized in the preferred embodiment of the present invention and does not include reconversion back into analog signal. This representation is schematic for illustrative purposes and is not intended to be limiting of the type of power supply used in practicing the present invention. Other power supplies could be employed.

Figure 3:
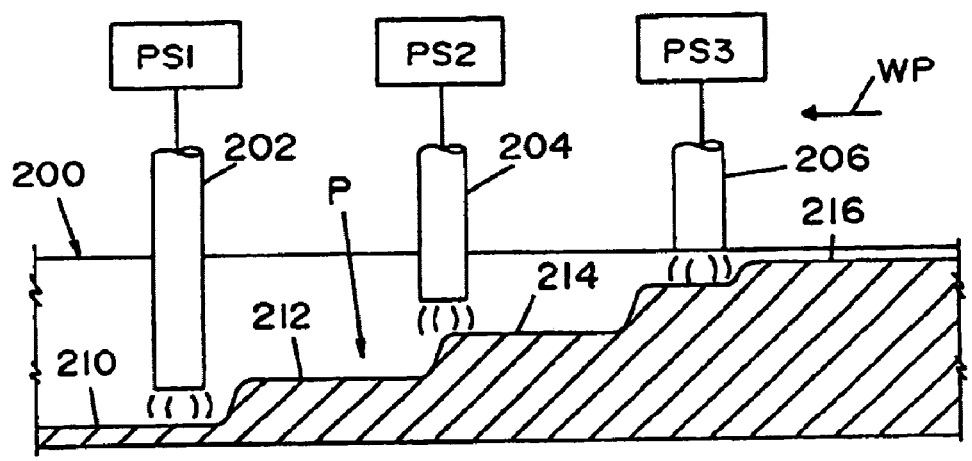
FIG. 3 is a cross sectional side view of three tandem electrodes operated in accordance with the present invention for welding the seam of a pipe.
Figure 4:
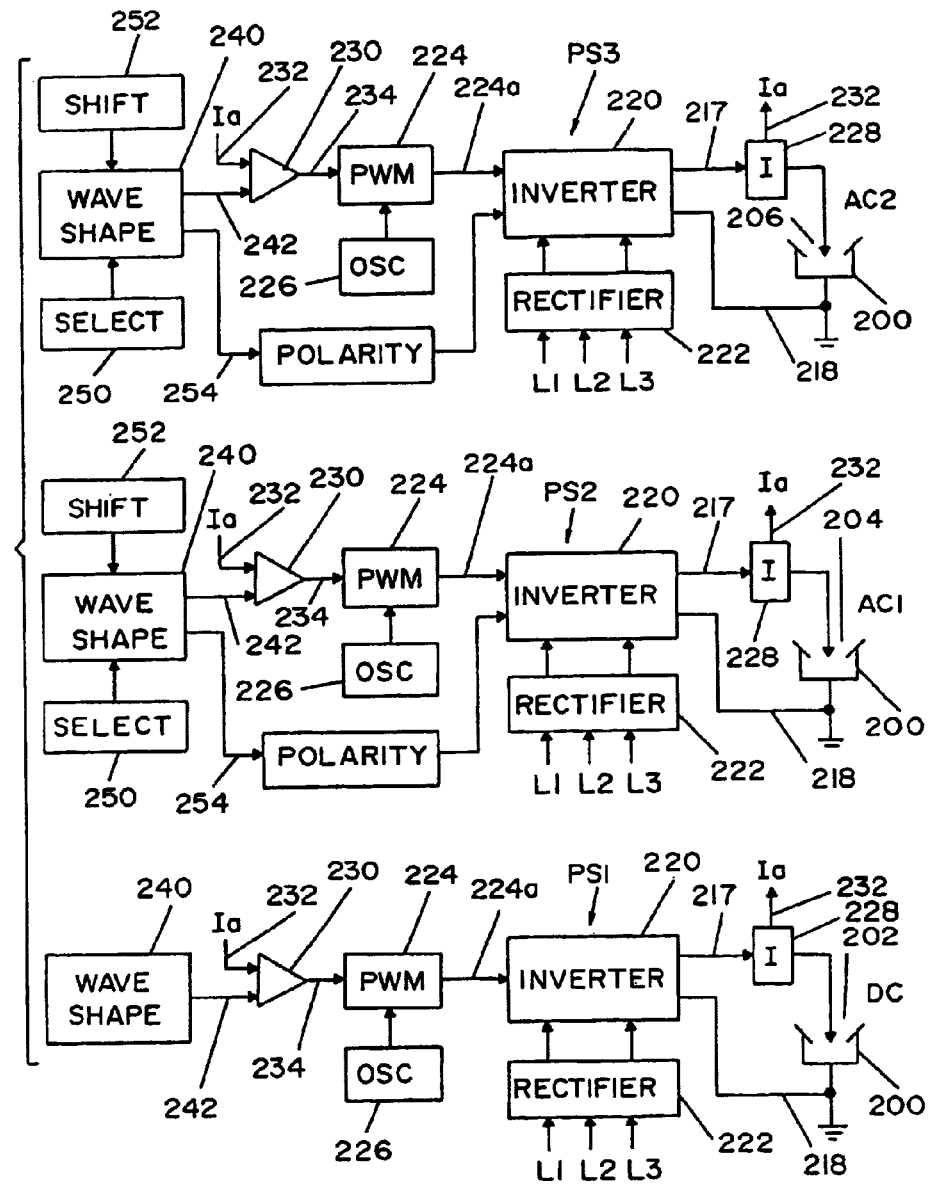
FIG. 4 is a schematic layout in block form of a welding system for three electrodes using the disclosure in Houston U.S. Pat. No. 6,472,634 and Stava U.S. Pat. No. 6,291,798.
Figure 5:
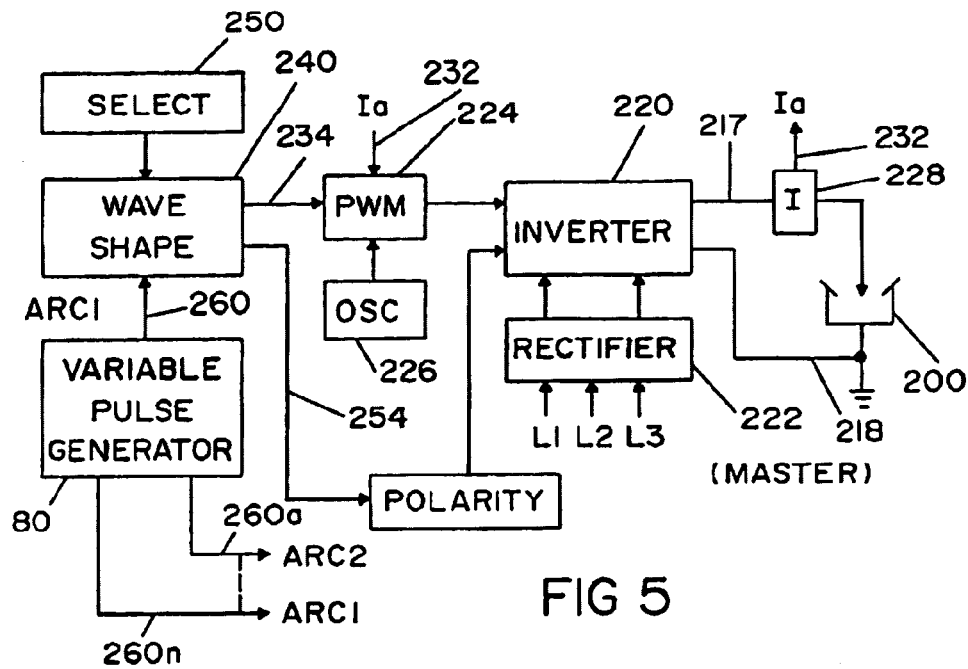
FIG. 5 is a block diagram showing a single electrode driven by the system as shown in FIG. 4 with a variable pulse generator disclosed in Houston U.S. Pat. No. 6,472,634.
Figure 7:
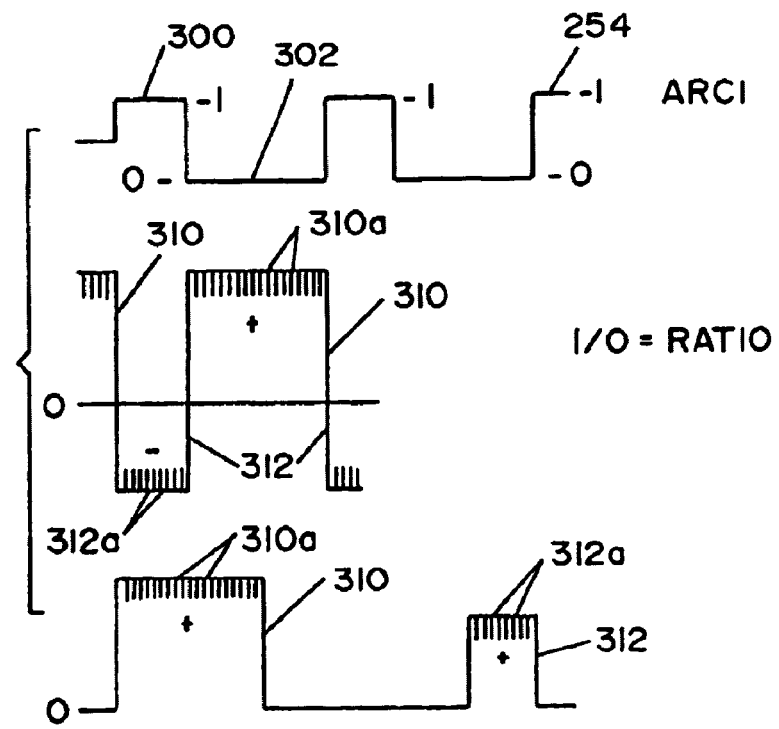
FIG. 7 is a current graph superimposed upon a signal having logic to determine the polarity of the waveform as used in practicing the present invention.

The practice of the present invention utilizing the concepts of FIGS. 1 and 2 are illustrated in FIGS. 3 and 4. Workpiece 200 is a seam in a pipe which is welded together by tandem electrodes 202, 204 and 206 powered by individual power supplies PS1, PS2, PS3, respectively. The power supplies can include more than one power source coordinated in accordance with the technology in Houston U.S. Pat. No. 6,472,634. The illustrated embodiment involves a DC arc for lead electrode 202 and an AC arc for each of the tandem electrodes 204, 206. The created waveforms of the tandem electrodes are AC currents and include shapes created by a wave shaper or wave generator in accordance with the previously described waveform technology. As electrodes 202, 204 and 206 are moved along weld path WP a molten metal puddle P is deposited in pipe seam 200 with an open root portion 210 followed by deposits 212, 214 and 216 from electrodes 202, 204 and 206, respectively. As previously described more than two AC driven electrodes as will be described and illustrated by the waveforms of FIG. 15, can be operated by the invention relating to AC currents of adjacent electrodes. The power supplies, as shown in FIG. 4, each include an inverter 220 receiving a DC link from rectifier 222. In accordance with Lincoln waveform technology, a chip or internal programmed pulse width modulator stage 224 is driven by an oscillator 226 at a frequency greater than 18 kHz and preferably greater than 20 kHz. As oscillator 226 drives pulse width modulator 224, the output current has a shape dictated by the wave shape outputted from wave shaper 240 as a voltage or digital numbers at line 242. Output leads 217, 218 are in series with electrodes 202, 204 and 206. The shape in real time is compared with the actual arc current in line 232 from Hall Effect transducer 228 by a stage illustrated as comparator 230 so that the outputs on line 234 controls the shape of the AC waveforms. The digital number or voltage on line 234 determines the output signal on line 224a to control inverter 220 so that the waveform of the current at the arc follows the selected profile outputted from wave shaper 240. This is standard Lincoln waveform technology, as previously discussed. Power supply PS1 creates a DC arc at lead electrode 202; therefore, the output from wave shaper 240 of this power supply is a steady state indicating the magnitude of the DC current. The present invention does not relate to the formation of a DC arc. To the contrary, the present invention is the control of the current at two adjacent AC arcs for tandem electrodes, such as electrodes 204, 206. In accordance with the invention, wave shaper 240 involves an input 250 employed to select the desired shape or profile of the AC waveform. This shape can be shifted in real time by an internal programming schematically represented as shift program 252. Wave shaper 240 has an output which is a priority signal on line 254. In practice, the priority signal is a bit of logic, as shown in FIG. 7. Logic 1 indicates a negative polarity for the waveform generated by wave shaper 240 and logic 0 indicates a positive polarity. This logic signal or bit controller 220 directed to the power supply is read in accordance with the technology discussed in FIG. 16. The inverter switches from a positive polarity to a negative polarity, or the reverse, at a specific "READY" time initiated by a change of the logic bit on line 254. In practice, this bit is received from variable pulse generator 80 shown in FIG. 1 and in FIG. 5. The welding system shown in FIGS. 3 and 4 is used in practicing the invention wherein the shape of AC arc currents at electrodes 204 and 206 have novel shapes to obtain a beneficial result of the present invention, i.e. a generally quiescent molten metal puddle P and/or synthesized sinusoidal waveforms compatible with transformer waveforms used in arc welding. The electric arc welding system shown in FIGS. 3 and 4 have a program to select the waveform at "SELECT" program 250 for wave shaper 240. In this manner the unique waveforms of the present invention are used by the tandem electrodes. One of the power supplies to create an AC arc is schematically illustrated in FIG. 5. The power supply or source is controlled by variable pulse generator 80, shown in FIG. 1. Signal 260 from the generator controls the power supply for the first arc. This signal includes the synchronization of the waveform together with the polarity bit outputted by the wave shaper 240 on line 254. Lines 260a–260n control the desired subsequent tandem AC arcs operated by the welding system of the present invention. The timing of these signals shifts the start of the other waveforms. FIG. 5 merely shows the relationship of variable pulse generator 80 to control the successive arcs as explained in connection with FIG. 4.

Figure 6:
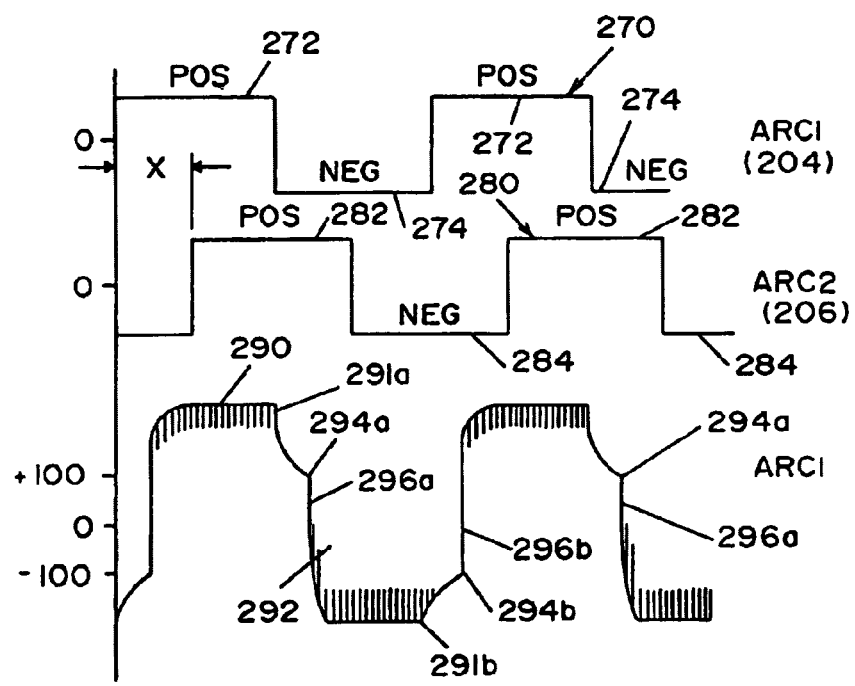
FIG. 6 is a current graph for one of two illustrated synchronizing pulses and showing a balanced AC waveform for one tandem electrode.
Figure 8:
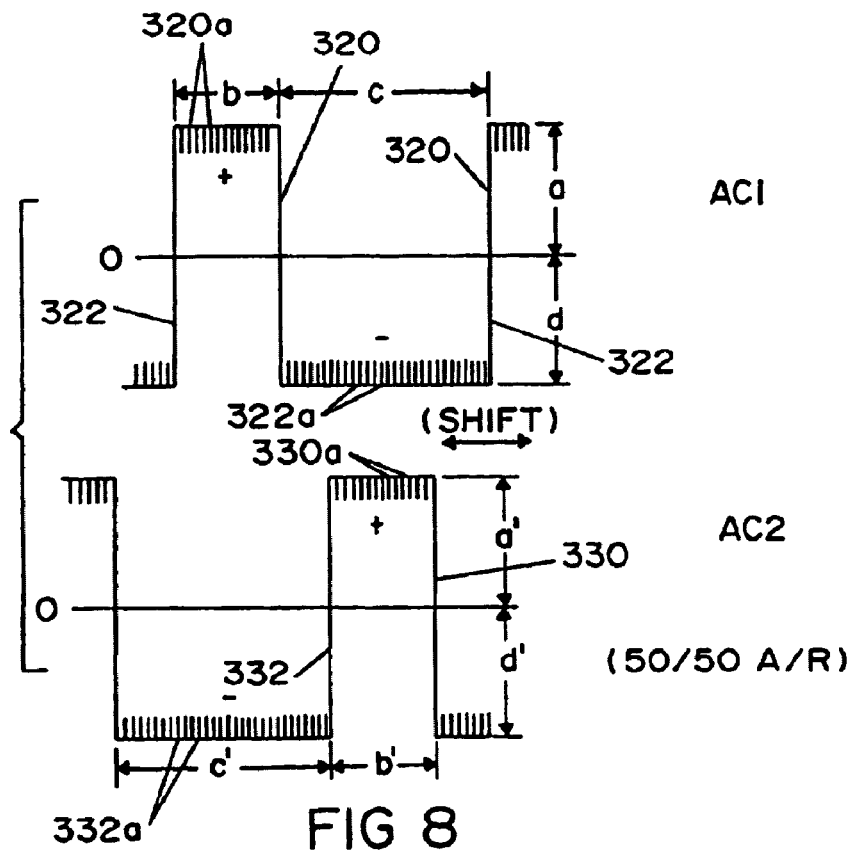
FIG. 8 is a current graph showing a broad aspect of the preferred embodiment of the present invention.

In the welding system of Houston U.S. Pat. No. 6,472,634, the AC waveforms are created as shown in FIG. 6 wherein the wave shaper for arc AC1 at electrode 204 creates a signal 270 having positive portions 272 and negative portions 274. The second arc AC2 at electrode 206 is controlled by signal 280 from the wave shaper having positive portions 282 and negative portions 284. These two signals are the same, but are shifted by the signal from generator 80 a distance x, as shown in FIG. 6. The waveform technology created current pulses or waveforms at one of the arcs are waveforms having positive portions 290 and negative portions 292 shown at the bottom portion of FIG. 6. A logic bit from the wave shaper determines when the waveform is switched from the positive polarity to the negative polarity and the reverse. In accordance with the disclosure in Stava U.S. Pat. No. 6,111,216 (incorporated by reference herein) pulse width modulator 224 is generally shifted to a lower level at point 291a and 291b. Then the current reduces until reaching a fixed level, such as 100 amps. Consequently, the switches change polarity at points 294a and 294b. This produces a vertical line or shape 296a, 296b when current transitioning between positive portion 290 and negative portion 292. This is the system disclosed in the Houston patent where the like waveforms are shifted to avoid magnetic interference. The waveform portions 290, 292 are the same at arc AC1 and at arc AC2. This is different from the present invention which relates to customizing the waveforms at arc AC1 and arc AC2 for purposes of controlling the molten metal puddle and/or synthesizing a sinusoidal wave shape in a manner not heretofore employed. The disclosure of FIG. 6 is set forth to show the concept of shifting the waveforms, but not the invention which is customizing each of the adjacent waveforms. The same switching procedure to create a vertical transition between polarities is used in the preferred embodiment of the present invention. Converting from the welding system shown in FIG. 6 to the present invention is generally shown in FIG. 7. The logic on line 254 is illustrated as being a logic 1 in portions 300 and a logic 0 in portions 302. The change of the logic or bit numbers signals the time when the system illustrated in FIG. 16 shifts polarity. This is schematically illustrated in the lower graph of FIG. 6 at points 294a, 294b. In accordance with the invention, wave shaper 240 for each of the adjacent AC arcs has a first wave shape 310 for one of the polarities and a second wave shape 312 for the other polarity. Each of the waveforms 310, 312 are created by the logic on line 234 taken together with the logic on line 254. Thus, pulses 310, 312 as shown in FIG. 7, are different pulses for the positive and negative polarity portions. Each of the pulses 310, 312 are created by separate and distinct current pulses 310a, 312a as shown. Switching between polarities is accomplished as illustrated in FIG. 6 where the waveforms generated by the wave shaper are shown as having the general shape of waveforms 310, 312. Positive polarity controls penetration and negative polarity controls deposition. In accordance with the invention, the positive and negative pulses of a waveform are different and the switching points are controlled so that the AC waveform at one arc is controlled both in the negative polarity and the positive polarity to have a specific shape created by the output of wave shaper 240. The waveforms for the arc adjacent to the arc having the current shown in FIG. 7 is controlled differently to obtain the advantages of the present invention. This is illustrated best in FIG. 8. The waveform at arc AC1 is in the top part of FIG. 8. It has positive portions 320 shown by current pulses 320a and negative portions 322 formed by pulses 322a. Positive portion 320 has a maximum magnitude a and width or time period b. Negative portion 322 has a maximum magnitude d and a time or period c. These four parameters are adjusted by wave shaper 240. In the illustrated embodiment, arc AC2 has the waveform shown at the bottom of FIG. 8 where positive portion 330 is formed by current pulses 330a and has a height or magnitude a' and a time length or period b'. Negative portion 332 is formed by pulses 332a and has a maximum magnitude d' and a time length c'. These parameters are adjusted by wave shaper 240. In accordance with the invention, the waveform from the wave shaper on arc AC1 is out of phase with the wave shape for arc AC2. The two waveforms have parameters or dimensions which are adjusted so that (a) penetration and deposition is controlled and (b) there is no long time during which the puddle P is subjected to a specific polarity relationship, be it a like polarity or opposite polarity. This concept in formulating the wave shapes prevents long term polarity relationships as explained by the showings in FIGS. 9 and 10. In FIG. 9 electrodes 204, 206 have like polarity, determined by the waveforms of the adjacent currents at any given time. At that instance, magnetic flux 350 of electrode 204 and magnetic flux 352 of electrode 206 are in the same direction and cancel each other at center area 354 between the electrodes. This causes the molten metal portions 360, 362 from electrodes 204, 206 in the molten puddle P to move together, as represented by arrows c. The arcs are pulled together so the arc force on the weld puddle moves the metal together. This inward movement together or collapse of the molten metal in puddle P between electrodes 204 will ultimately cause an upward gushing action, if not terminated in a very short time, i.e. less than about 20 ms. As shown in FIG. 10, the opposite movement of the puddle occurs when the electrodes 204, 206 have opposite polarities. Then, magnetic flux 370 and magnetic flux 372 are accumulated and increased in center portion 374 between the electrodes. High forces between the electrodes causes the molten metal portions 364, 366 of puddle P to retract or be forced away from each other. This is indicated by arrows r. The arcs are pushed apart so the arc force on the weld puddle moves the metal apart. Such outward forcing of the molten metal in puddle P causes disruption of the weld bead if it continues for a substantial time which is generally less than 10 ms. As can be seen from FIGS. 9 and 10, it is desirable to limit the time during which the polarity of the waveform at adjacent electrodes is either the same polarity or opposite polarity. The present invention utilizes the waveform, such as shown in FIG. 6, to accomplish this objective of preventing long term concurrence of specific polarity relationships, be it like polarities or opposite polarities. Both of these relationships are detrimental to quality welding and are avoided when using the present invention. As shown in FIG. 8, like polarity and opposite polarity is retained for a very short time less than the cycle length of the waveforms at arc AC1 and arc AC2. This positive development of preventing long term occurrence of polarity relationships together with the novel concept of pulses having different shapes and different proportions in the positive and negative areas combine to control the puddle, control penetration and control deposition in a manner not heretofore obtainable in welding with a normal transformer power supplies or normal use of Lincoln waveform technology.

An implementation of the present invention is shown in FIG. 11 wherein the positive and negative portions of the AC waveform from the wave shaper 240 are synthesized sinusoidal shapes with a different energy in the positive portion as compared to the negative portion of the waveforms. The synthesized sine wave or sinusoidal portions of the waveforms is novel. It allows the waveforms to be compatible with transformer welding circuits and compatible with evaluation of sine wave welding. In FIG. 11, waveform 370 is at arc AC1 and waveform 372 is at arc AC2. These tandem arcs utilize the AC welding current shown in FIG. 11 wherein a small positive sinusoidal portion 370a controls penetration at arc AC1 while the larger negative portion 370b controls the deposition of metal at arc AC1. There is a switching between the polarities with a change in the logic bit, as discussed in FIG. 7. Sinusoidal waveform 370 plunges vertically from approximately 100 amperes through zero current as shown in by vertical line 370c. Transition between the negative portion 370b and positive portion 370a also starts a vertical transition at the switching point causing a vertical transition 370d. In a like manner, phase shifted waveform 372 of arc AC2 has a small penetration portion 372a and a large negative deposition portion 372b. Transition between polarities is indicated by vertical lines 372c and 372d. Waveform 372 is shifted with respect to waveform 370 so that the dynamics of the puddle are controlled without excessive collapsing or repulsion of the molten metal in the puddle caused by polarities of adjacent arcs AC1, AC2. In the embodiment shown in FIG. 11, the sine wave shapes are the same and the frequencies are the same. They are merely shifted to prevent a long term occurrence of a specific polarity relationship.

Figure 12:
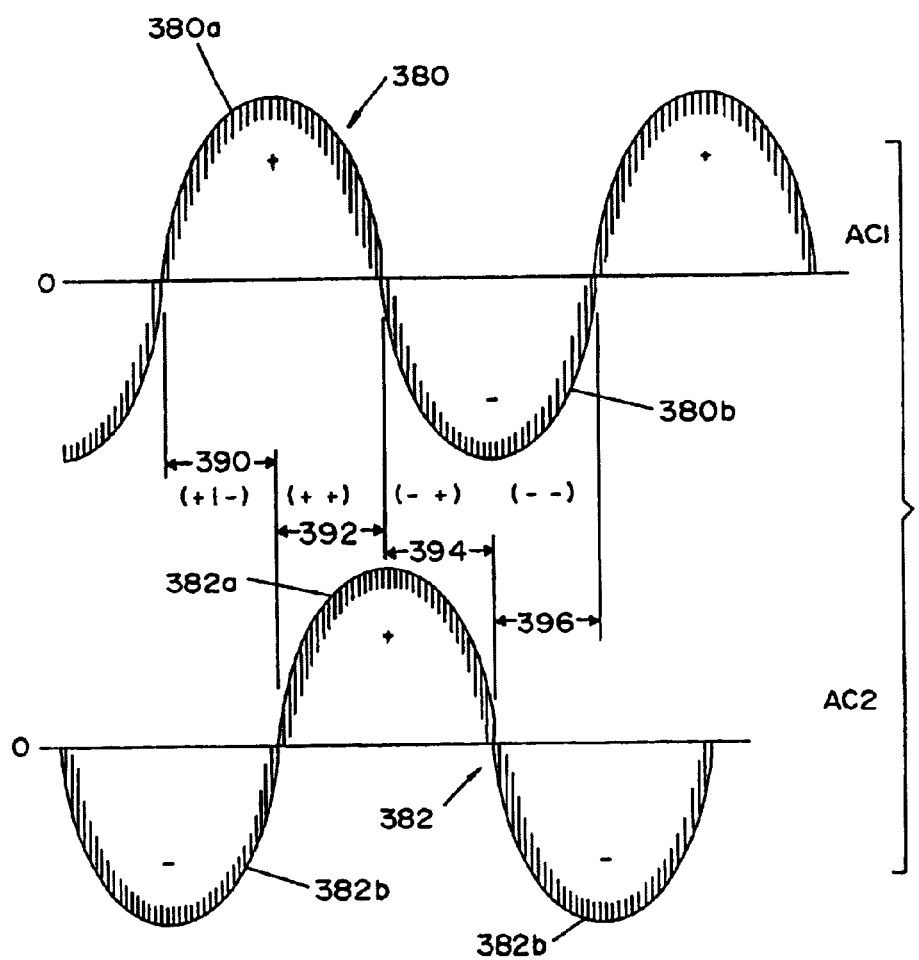
FIG. 12 is a pair of current graphs of the AC waveforms on adjacent tandem electrodes with areas of concurring polarity relationships.
Figure 13:
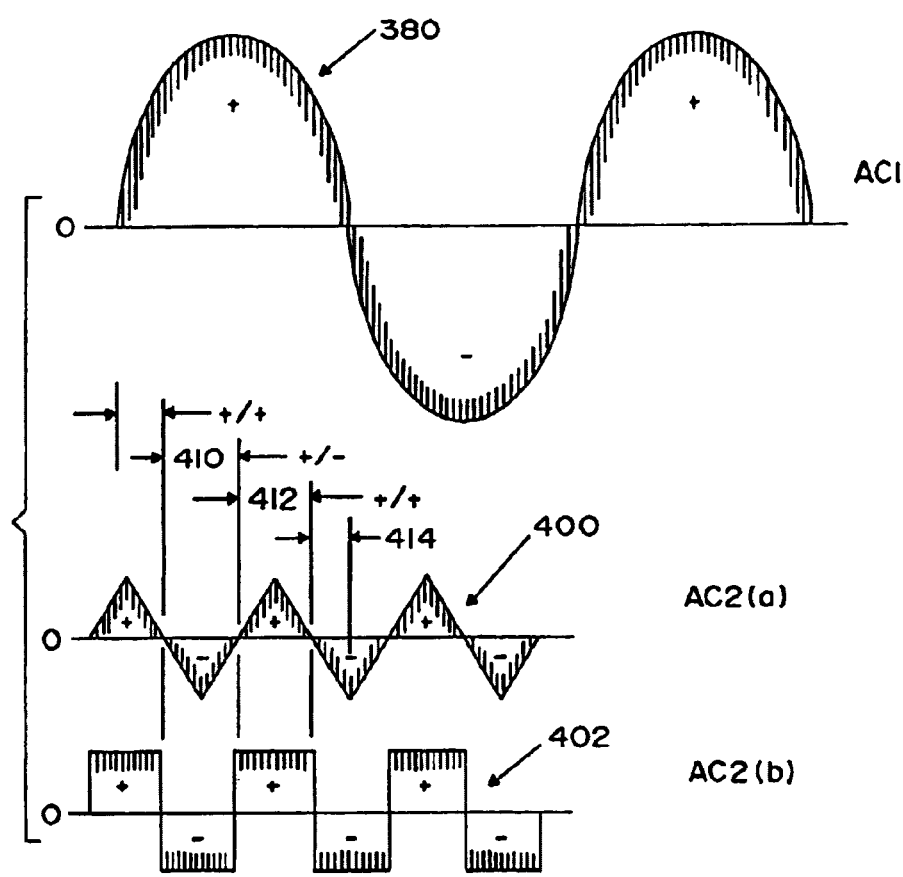
FIG. 13 are current graphs of the waveforms on adjacent tandem electrodes wherein the AC waveform of one electrode is substantially different waveform of the other electrode to limit the time of concurrent polarity relationships.
Figure 14:
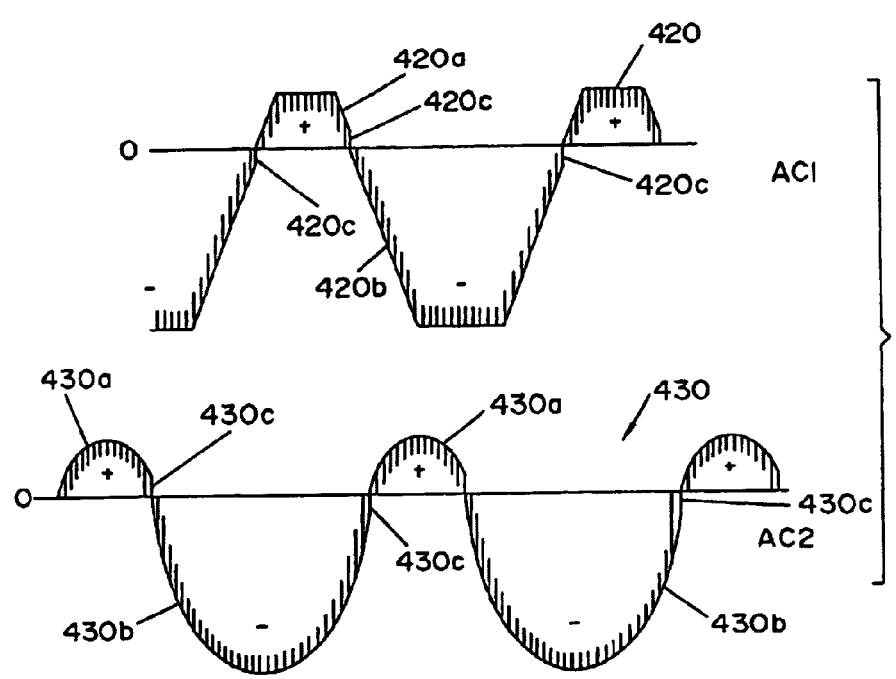
FIG. 14 are current graphs of two sinusoidal waveforms for adjacent electrodes operated by a system in accordance with the present invention to use different shaped wave forms for the adjacent electrodes.

Another aspect of the invention is schematically illustrated in FIG. 12 wherein waveform 380 is used for arc AC1 and waveform 382 is used for arc AC2. Portions 380a, 380b, 382a, and 382b are sinusoidal synthesized and are illustrated as being of the same general magnitude. By shifting these two waveforms 90°, areas of concurrent polarity are identified as areas 390, 392, 394 and 396. By using the shifted waveforms with sinusoidal profiles, like polarities or opposite polarities do not remain for any length of time. Thus, the molten metal puddle is not agitated and remains quiescent. This advantage is obtained by using the present invention which also combines the concept of a difference in energy between the positive and negative polarity portions of a given waveform. FIG. 12 is illustrative in nature to show the definition of concurrent polarity relationships and the fact that they should remain for only a short period of time. To accomplish this objective, another embodiment of the present invention is illustrated in FIG. 13 wherein previously defined waveform 380 is combined with waveform 400, shown as the sawtooth waveform of arc AC2(a) or the pulsating waveform 402 shown as the waveform for arc AC2(b). Combining waveform 380 with the different waveform 400 of a different waveform 402 produces very small areas or times of concurrent polarity relationships 410, 412, 414, etc. The invention illustrated in FIG. 14 has the AC waveform generated at one arc drastically different than the AC waveform generated at the other arc. This same concept of drastically different waveforms for use in the present invention is illustrated in FIG. 14 wherein waveform 420 is an AC pulse profile waveform and waveform 430 is a sinusoidal profile waveform having about one-half the period of waveform 420. Waveform 420 includes a small penetration positive portion 420a and a large deposition portion 420b with straight line polarity transitions 420c. Waveform 430 includes positive portion 430a and negative portion 430b with vertical polarity transitions 430c. By having these two different waveforms, both the synthesized sinusoidal concept is employed for one electrode and there is no long term concurrent polarity relationship. Thus, the molten metal in puddle P remains somewhat quiescent during the welding operation by both arcs AC1, AC2.

Figure 15:
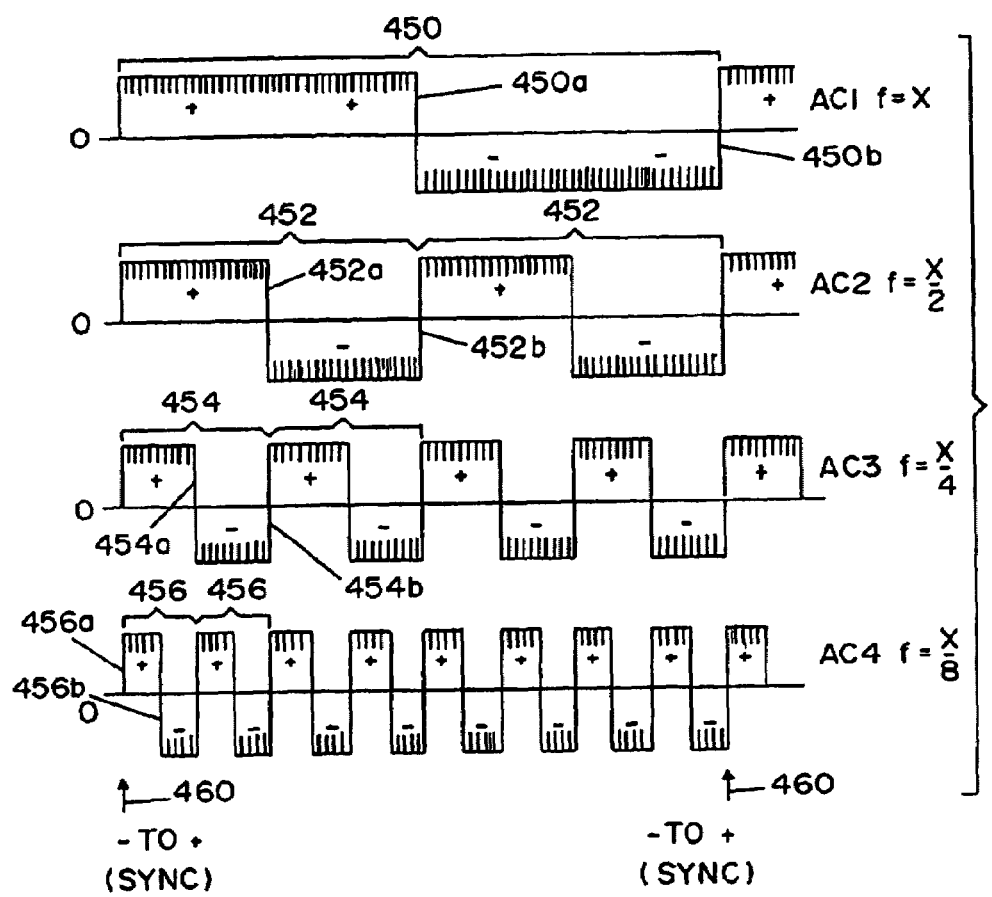
FIG. 15 are current graphs showing waveforms at four adjacent AC arcs of tandem electrodes shaped and synchronized in accordance with an aspect of the invention.

Another aspect of the present invention is illustrated in FIG. 15 wherein waveforms 450, 452, 454 and 456 are generated by the wave shaper 240 of the power supply for each of four tandem arcs, arc AC1, arc AC2, arc AC3 and arc AC4. The adjacent arcs are aligned as indicated by synchronization signal 460 defining when the waveforms correspond and transition from the negative portion to the positive portion. This synchronization signal is created by generator 80 shown in FIG. 1, except the start pulses are aligned. In this embodiment of the invention first waveform 450 has a positive portion 450a, which is synchronized with both the positive and negative portion of the adjacent waveform 452, 454 and 456. For instance, positive portion 450a is synchronized with and correlated to positive portion 452a and negative portion 452b of waveform 452. In a like manner, the positive portion 452a of waveform 452 is synchronized with and correlated to positive portion 454a and negative portion 454b of waveform 454. The same relationship exist between positive portion 454a and the portions 456a, 456b of waveform 456. The negative portion 450b is synchronized with and correlated to the two opposite polarity portions of aligned waveform 452. The same timing relationship exist between negative portion 452b and waveform 454. In other words, in each adjacent arc one polarity portion of the waveform is correlated to a total waveform of the adjacent arc. In this manner, the collapse and repelling forces of puddle P, as discussed in connection with FIGS. 9 and 10, are dynametically controlled. In this embodiment of the invention, one or more of the positive or negative portions can be synthesized sinusoidal waves as discussed in connection with an aspect of the invention disclosed in FIGS. 11 and 12.

As indicated in FIGS. 1 and 2, when the master controller of switches is to switch, a switch command is issued to master controller 140a of power supply 30. This causes a "kill" signal to be received by the master so a kill signal and polarity logic is rapidly transmitted to the controller of one or more slave power supplies connected in parallel with a single electrode. If standard AC power supplies are used with large snubbers in parallel with the polarity switches, the slave controller or controllers are immediately switched within 1–10 μs after the master power supply receives the switch command. This is the advantage of the high accuracy interface cards or gateways. In practice, the actual switching for current reversal of the paralleled power supplies is not to occur until the output current is below a given value, i.e. about 100 amperes. This allows use of smaller switches.

Figure 16:
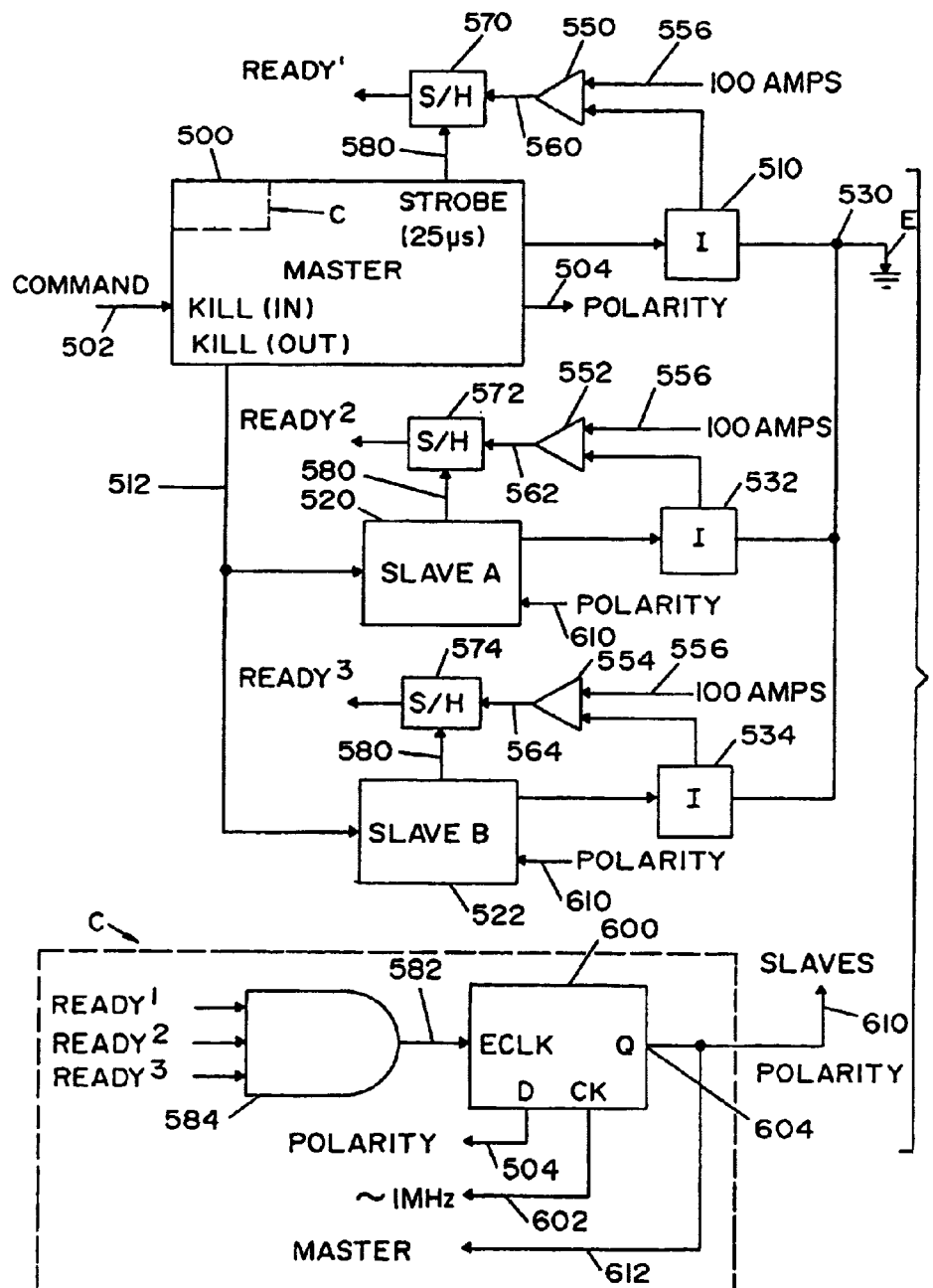
FIG. 16 is a schematic layout of the software program to cause switching of the paralleled power supplies as soon as the coordinated switch commands have been processed and the next coincident signal has been created.

The implementation of the switching for all power supplies for a single AC arc uses the delayed switching technique where actual switching can occur only after all power supplies are below the given low current level. The delay process is accomplished in the software of the digital processor and is illustrated by the schematic layout of FIG. 16. When the controller of master power supply 500 receives a command signal as represented by line 502, the power supply starts the switching sequence. The master outputs a logic on line 504 to provide the desired polarity for switching of the slaves to correspond with polarity switching of the master. In the commanded switch sequence, the inverter of master power supply 500 is turned off or down so current to electrode E is decreased as read by hall effect transducer 510. The switch command in line 502 causes an immediate "kill" signal as represented by line 512 to the controllers of paralleled slave power supplies 520, 522 providing current to junction 530 as measured by hall effect transducers 532, 534. All power supplies are in the switch sequence with inverters turned off or down. Software comparator circuits 550, 552, 554 compare the decreased current to a given low current referenced by the voltage on line 556. As each power supply decreases below the given value, a signal appears in lines 560, 562, and 564 to the input of a sample and hold circuits 570, 572, and 574, respectively. The circuits are outputted by a strobe signal in line 580 from each of the power supplies. When a set logic is stored in a circuit 570, 572, and 574, a YES logic appears on lines READY$^1$, READY$^2$, and READY$^3$ at the time of the strobe signal. This signal is generated in the power supplies and has a period of 25 μs; however, other high speed strobes could be used. The signals are directed to controller C of the master power supply, shown in dashed lines in FIG. 8. A software ANDing function represented by AND gate 580 has a YES logic output on line 582 when all power supplies are ready to switch polarity. This output condition is directed to clock enable terminal ECLK of software flip flop 600 having its D terminal provided with the desired logic of the polarity to be switched as appearing on line 504. An oscillator or timer operated at about 1 MHz clocks flip flop by a signal on line 602 to terminal CK. This transfers the polarity command logic on line 504 to a Q terminal 604 to provide this logic in line 610 to switch slaves 520, 522 at the same time the identical logic on line 612 switches master power supply 500. After switching, the polarity logic on line 504 shifts to the opposite polarity while master power supply awaits the next switch command based upon the switching frequency. Other circuits can be used to effect the delay in the switching sequence; however, the illustration in FIG. 16 is the present scheme.

The present application relates to the waveforms controlled by a wave shaper or waveform generator of an electric arc power supply including a single power source or multiple power sources correlated as disclosed in Houston U.S. Pat. No. 6,472,634 or Stava U.S. Pat. No. 6,291,798. The invention relates to tandem electrodes powered by an AC waveform. The two adjacent electrodes have waveforms that control the dynamics of the molten metal puddle between the electrodes and/or uses synthesized sine waves to correlate the operation of the tandem welding system with standard transformer welding operations. The invention involves controlling the energy of the positive and negative portions in each of the AC waveforms created by a wave shaper or waveform generator through the use of a high speed switching inverter in accordance with standard practice. Different energy in the positive portion and negative portion controls the relationship of the amount of penetration to the amount of deposition by a particular electrode. This allows operation of adjacent electrodes in a manner to maintain the weld puddle generally quiescent. This action improves the resulting weld bead and the efficiency of the welding operation. To control the weld puddle, adjacent waveforms generated by the wave shaper have different shapes to control the length of time during which a given polarity relationship exist between the adjacent electrodes. In other words, the time that the waveforms of adjacent electrodes have like polarity or opposite polarity is limited by using different shapes and different relationships between the two adjacent AC waveforms generated by the waveform technology using a wave shaper or waveform generator. As disclosed in FIG. 15, synchronizing the wave shapes of adjacent generated waveforms having a frequency of adjacent electrodes which is essentially a multiple of two. All of these unique waveforms are novel and provide beneficial results in an electric arc welding using tandem electrodes, especially for seam welding of pipes in making pipeline sections.

In FIG. 4, a system and method is illustrated utilizing a leading DC electrode following by tandem AC driven electrodes AC1 and AC2. The present invention is primarily applicable to a submerged arc welding operation including merely a plurality of tandem electrodes each driven by a AC waveform constructed by a wave shaper or waveform generator in accordance with waveform technology used in the Power Wave power source sold by The Lincoln Electric Company of Cleveland, Ohio. This power source is capable of changing the waveform of each electrode in increments of one degree. The invention relates to controlling the AC current waveforms of adjacent electrodes. The electrodes may be the first and second, second and third, third and fourth, fourth and fifth, fifth and sixth, etc. The adjacent electrodes driven by an AC current waveform created by a waveform generator or wave shaper. The invention uses a cored electrode to assist in transition between positive and negative polarities. The invention will be described in connection with specific AC pulse waveforms, as shown in FIGS. 17 and 18 illustrating representative waveforms for adjacent tandem electrodes. In FIG. 17, curve or waveform 700 has a positive portion 702 and a negative portion 704. For illustrative and explanatory purposes, waveform or current curve 700 is divided into segments 710, 712, 714 and 716. Waveform 720 for the arc of the second electrode has a positive portion 722 and a negative portion 724. Four waveform segments 730, 732, 734 and 736 are aligned with the corresponding waveform segments 710, 712, 714 and 716, respectively.

During welding, the two arcs are moved along the weld path. The adjacent arcs are in a "push" condition at segments 710, 724. These segments have opposite polarity so the arcs are pushed away from each other. In the next aligned segment area, segments 712 and 732 are at the same polarity so the arcs tend to pull together. During the weld cycle indicated by waveform or curve 700, the arcs are alternately pushed apart and pulled together at each change in condition of the polarity relationship. The waveforms have a cycle length of between 10–20 ms and, thus, each segment is approximately 2.5–5.0 ms in length. In accordance with the invention, the waveforms 700, 720 of adjacent electrodes are controlled so that the push and pull events are sustained less than about 5.0 ms. If the push condition is maintained for a longer time, the weld puddle is affected and the arcs spread to change the stability of the welding process. In a like manner, if a pull condition is maintained for a prolonged time, the arcs of the adjacent electrodes pull together and affect the puddle dynamics. The present invention relates to adjacent waveforms having alternate push and pull conditions dictated by the polarity relationships wherein the waveforms are adjusted so the maintained or sustained time of either a push condition or a pull condition is less than about 5.0 ms. This method is illustrated in FIG. 17. The same method is illustrated in FIG. 18 wherein the cycle length is still 10–20 ms. Waveform or curve 740 of the first arc has positive portions 742 and negative portions 744. For illustrative and explanatory purposes, curve or waveform 740 is divided into time segments 750, 752, 754, and 756. Due to the shape of waveform 740, a fifth time segment 758 is identified. This last segment is a duplicate of leading segment 750. The adjacent electrode has a second arc shown as curve or waveform 760 with positive portions 762 and negative portions 764. To correspond with the segments of waveform 740, waveform 760 is divided into segments 770, 772, 774 and 776. The two waveforms are adjusted so that the positive deposition portion is correlated with the negative penetration portion in accordance with standard welding technology. By providing greater penetration with the electrode using waveform 740 and higher deposition with the electrode using waveform 760 the welding operation is customized. When this is done, there is a problem of prolonged periods of arc push or arc pull. In accordance with the present invention, waveforms as shown in FIG. 17 or FIG. 18 are created to avoid prolonged periods of push or pull.

In FIG. 18, segments 750, 770 have opposite polarities; therefore, an arc push condition exists. In the area of the waveforms defined by segments 752 and 772, the polarities are the same; therefore, there is an arc pull condition. Each of the curves are divided by four so the arc push and arc pull conditions alternate as illustrated in FIG. 18. The same alternating procedure is illustrated in the waveforms of two adjacent electrodes as disclosed in FIG. 17. The waveforms need not have the same cycle length, nor equal positive and negative magnitudes. The positive and negative magnitudes are adjusted to control deposition and penetration by the arcs. In accordance with the invention, the waveforms of adjacent electrodes, as shown in FIGS. 17 and 18, are adjusted so that the sustained and/or maintained time of a push or pull condition is limited to less than about 5.0 ms. The waveforms can be sinusoidal or pulsed AC waveforms, as shown in FIGS. 17 and 18. The system and method of the present invention relates to limiting the amount of time of either an arc push or an arc pull condition.

The preferred program or method processed by the controller of the power supplies. To perform the present invention, program or method 800 shown in FIG. 19 is practiced by the digital section of the controller which section is normally a DSP or microprocessor. Preferably method 800 is performed by the controller of a Power Wave power source. As illustrated in FIG. 19, the cycle length of the waveforms of adjacent electrodes are indicated by blocks 802, 804. In the preferred embodiment, these two blocks are identical using the same cycle length of about 10–20 ms. The polarity of the individual arcs is determined by detectors 810, 812 reading the arc polarities of the method at any given time. The polarity of adjacent arcs is communicated from detectors 810, 812 to comparator network 820. If the polarities are opposite, an arc push condition exist. This creates a logic signal in line 822. If the polarities are the same, a logic signal appears in line 824. This signal indicates a pull condition for the arc. Of course, if either waveform is at zero, there is no push or pull condition. Referring now to a push condition with a logic 1 in line 822, which is a YES signal from network 820. Time counter 830 is started by the logic signal in line 822 to count in accordance with clock 832. Although not necessary in all instances, a reset circuit 834 creates a digital signal in line 836 to reset counter 830 at the end of cycle 804. The output of counter 830 is directed to a decision device or network 840. If the counter reaches a level greater than about 5.0 ms, a YES signal is created in line 842. This YES signal activates waveform adjust routine 850 to create an adjusting signal in lines 852, 854 for changing the wave shape created by generators 740a, 740b. In this manner, pulse width modulators 224a, 224b are adjusted to operate Power Wave inverter power sources 220a, 220b for the purpose of adjusting the AC waveforms at ARC 1, ARC 2. In this manner, a waveform adjustment is made to assure that the push condition does not have a sustained existence greater than about 5.0 ms.

In a like manner, program or method 800 controls the pull condition of the arcs between adjacent electrodes. When there is a pull condition, due to a like polarity between the adjacent waveforms, a YES signal appears in line 824 to start the pull time counter 860. The counter is driven by clock 862. In accordance with a feature not necessary in practicing the invention, reset 864 creates a digital signal represented by a signal on line 866 to reset counter 860 at the end of each cycle 802. A decision device 870 determines whether the pull condition is maintained or sustained for greater than about 5.0 ms. If the decision device creates a YES signal in line 872, adjust routine 880 is activated to adjust the signal in lines 882, 884 directed to the two wave shape generators or wave shapers 240a, 240b to adjust the operation of pulse width modulators 224a, 224b for adjusting the operation of the power wave inverter power sources 220a, 220b. This adjusts the arc ARC 1 and arc ARC 2 to assure that a push condition does not last for greater than about 5.0 ms. Since a push condition and a pull condition are opposite events, a coincidence network 890 is employed in program 800. This network includes an enable signal in line 892 from counter 830 and an enable signal in line 894 from counter 860. Inverter gates 896, 898 in lines 892, 894, respectively, change the logic on lines 892, 894. Thus, when time 830 is not operating, timer 860 is enabled. In a like manner, when timer 860 is not operating, timer 830 is enabled. Thus, the two counters 830, 860 are not operated at the same time. By using program or method 800, the sustained time of either a push condition or a pull condition between adjacent AC driven electrodes is limited by adjusting wave shape generator through the controller of a Power Wave welder. These wave shape generators can be adjusted manually to accomplish the objective of method 800. Manual adjustment can be made visually by observing the dynamics of the weld puddle. However, method 800 is preferably performed in the digital controller of the welder. The time 5.0 ms is preferred; however, this value is not critical, but it's more a general magnitude. The use of this time designation, teaches a person skilled in the art how to accomplish the objectives of the invention.

What is claimed is:

1. An electric arc welding system for creating a first AC welding arc with a first current waveform between a first electrode and a workpiece by a first power supply and a second AC welding arc with a second current waveform between a second electrode and a workpiece by a second power supply as said first and second electrodes are moved in unison along a welding path, said first and second power supply each comprising an high speed switching inverter creating its waveform by a number of current pulses occurring at a frequency of at least 18 kHz with the magnitude of each current pulse controlled by a wave shaper and the polarity of said waveforms controlled by a signal, wherein said first and second AC waveforms have a positive portion and a negative portion and a cycle period of about 10–20 ms, a detector arrangement configured to detect, at any given time, the polarity of the first waveform of the first AC welding arc and the polarity of the second waveform of the second AC welding arc, a comparator arrangement configured to receive and compare the detected polarities of the first waveform and the second waveform and to determine when the polarities are the same, which identifies a pull state, and when the polarities are opposite, which identifies a push state, a first timing circuit for determining the push time of a sustained maintenance of opposite polarity between said waveforms and a waveform adjusting circuit to limit said push time to less than about 5.0 ms.

2. An electric arc welding system as defined in claim 1 wherein said AC waveforms are generally sinusoidal.

3. An electric arc welding system as defined in claim 1 including a second timing circuit for determining the pull time of a sustained maintenance of the same polarity between said waveforms and a second waveform adjusting circuit to limit said pull time to less than about 5.0 ms.

4. An electric arc welding system as defined in claim 3 wherein one of said waveforms is generally a square AC waveform.

5. An electric arc welding system as defined in claim 3 wherein both of said waveforms are generally a square AC waveform.

6. An electric arc welding system as defined in claim 3 wherein one of said waveforms is a pulse AC waveform.

7. An electric arc welding system as defined in claim 1 wherein one of said waveforms is generally a square AC waveform.

8. An electric arc welding system as defined in claim 1 wherein both of said waveforms are generally a square AC waveform.

9. An electric arc welding system as defined in claim 1 wherein one of said waveforms is a pulse AC waveform.

10. An electric arc welding system as defined in claim 1 wherein said system is a submerged arc system.

11. An electric arc welding system as defined in claim 1, wherein the first timing circuit is adjustable.

12. An electric arc welding system as defined in claim 1, wherein the first electrode and the second electrode are configured as tandem electrodes.

13. An electric arc welding system as defined in claim 1, wherein a phase change between the first waveform of the first electrode and the second waveform of the second electrode are alterable in increments of one degree.

14. An electric arc welding system as defined in claim 1, further including a controller which controls operation of the detector arrangement, comparator arrangement, the first timing circuit and waveform adjusting circuit.

15. An electric arc welding system for creating a first AC welding arc with a first current waveform between a first electrode and a workpiece by a first power supply and a second AC welding arc with a second current waveform between a second electrode and a workpiece by a second power supply as said first and second electrodes are moved in unison along a welding path, said first and second power supply each comprising an high speed switching inverter creating its waveform by a number of current pulses occurring at a frequency of at least 18 kHz with the magnitude of each current pulse controlled by a wave shaper and the polarity of said waveforms controlled by a signal, wherein said first and second AC waveforms have a positive portion and a negative portion and a cycle period of about 10–20 ms, a detector arrangement configured to detect, at any given time, the polarity of the first waveform of the first AC welding arc and the polarity of the second waveform of the second AC welding arc, a comparator arrangement configured to receive and compare the detected polarities of the first waveform and the second waveform and to determine when the polarities are the same, which identifies a pull state, and when the polarities are opposite, which identifies a push state, a timing circuit for determining the pull time of a sustained maintenance of same polarity between said waveforms and a waveform adjusting circuit to limit said pull time to less than about 5.0 ms.

16. An electric arc welding system as defined in claim 15 wherein said AC waveforms are generally sinusoidal.

17. An electric arc welding system as defined in claim 15 wherein both of said waveforms are generally a square AC waveform.

18. An electric arc welding system as defined in claim 15 wherein one of said waveforms is a pulse AC waveform.

19. An electric arc welding system as defined in claim 15 wherein said system is a submerged arc system.

20. An electric arc welding method for creating a first AC welding arc with a first current waveform between a first electrode and a workpiece by a first power supply and a second AC welding arc with a second current waveform between a second electrode and a workpiece by a second power supply as said first and second electrodes are moved in unison along a welding path, said first and second power supply each comprising an high speed switching inverter creating its waveform by a number of current pulses occurring at a frequency of at least 18 kHz with the magnitude of each current pulse controlled by a wave shaper and the polarity of said waveforms controlled by a signal, wherein said first and second AC waveform have a positive portion and a negative portion and a cycle period of about 10–20 ms, said method comprising:
(a) detecting, at any given time, the polarity of the first waveform of the first AC welding arc and the polarity of the second waveform of the second AC welding arc;
(b) comparing the detected polarities of the first waveform and the second waveform;
(c) determining when if the polarities are the same and when the polarities are opposite, wherein when the polarities are the same a null state exists and when the polarities are opposite a push state exists;
(d) determining the push time of a sustained maintenance of opposite polarity between said waveforms; and,
(e) adjusting said waveforms to limit said push time to less than about 5.0 ms.

21. An electric arc welding method as defined in claim 20 wherein said AC waveforms are generally sinusoidal.

22. An electric arc welding method as defined in claim 21 further including:
(f) determining the pull time of a sustained maintenance of the same polarity between said waveforms; and,
(g) adjusting said waveforms to limit said pull time to less than about 5.0 ms.

23. An electric arc welding method as defined in claim 20 including a second timing circuit for determining the pull time of a sustained maintenance of the same polarity between said waveforms and a second waveform adjusting circuit to limit said pull time to less than about 5.0 ms.

24. An electric arc welding method as defined in claim 23 wherein one of said waveforms is generally a square AC waveform.

25. An electric arc welding method as defined in claim 20 wherein both of said waveforms are generally a square AC waveform.

26. An electric arc welding method as defined in claim 23 wherein one of said waveforms is a pulse AC waveform.

27. An electric arc welding method as defined in claim 20 wherein one of said waveforms is generally a square AC waveform.

28. An electric arc welding method as defined in claim 20 wherein both of said waveforms are generally a square AC waveform.

29. An electric arc welding method as defined in claim 20 wherein one of said waveforms is a pulse AC waveform.

30. An electric arc welding method as defined in claim 20 wherein the welding process is submerged arc.

31. An electric arc welding method as defined in claim 20, further including adjusting operation of the timing circuit.

32. An electric arc welding method as defined in claim 20, further including configuring the first electrode and the second electrode as tandem electrodes.

33. An electric arc welding method as defined in claim 20, further including providing a phase change between the first waveform of the first electrode and the second waveform of the second electrode in a one degree increment.

34. An electric arc welding method as defined in claim 20, further including controlling operation of the detector arrangement, comparator arrangement, the first timing circuit and waveform adjusting circuit by a controller of the welding system.

35. An electric arc welding method for creating a first AC welding arc with a first current waveform between a first electrode and a workpiece by a first power supply and a second AC welding arc with a second current waveform between a second electrode and a workpiece by a second power supply as said first and second electrodes are moved in unison along a welding path, said first and second power supply each comprising an high speed switching inverter creating its waveform by a number of current pulses occurring at a frequency of at least 18 kHz with the magnitude of each current pulse controlled by a wave shaper and the polarity of said waveforms controlled by a signal, wherein said first and second AC waveforms have a positive portion and a negative portion and a cycle period of about 10–20 ms, said method comprising:
  (a) detecting, at any given time, the polarity of the first waveform of the first AC welding arc and the polarity of the second waveform of the second AC welding arc;
  (b) comparing the detected polarities of the first waveform and the second waveform;
  (c) determining when if the polarities are the same and when the polarities are opposite, wherein when the polarities are the same a pull state exists and when the polarities are opposite a push state exists;
  (d) determining the pull time of a sustained maintenance of same polarity between said waveforms; and,
  (e) adjusting said waveforms to limit said pull time to less than about 5.0 ms.

36. An electric arc welding method as defined in claim 35 wherein said AC waveforms are generally sinusoidal.

37. An electric arc welding method as defined in claim 35 wherein one of said waveforms is generally a square AC waveform.

38. An electric arc welding method as defined in claim 35 wherein both of said waveforms are generally a square AC waveform.

39. An electric arc welding method as defined in claim 35 wherein the welding process is submerged arc.

* * * * *